(12) United States Patent
Niwa et al.

(10) Patent No.: US 10,880,509 B2
(45) Date of Patent: Dec. 29, 2020

(54) SOLID-STATE IMAGING ELEMENT, ELECTRONIC DEVICE, AND METHOD FOR CORRECTING UNEVEN LUMINANCE

(71) Applicant: SONY SEMICONDUCTOR SOLUTIONS CORPORATION, Kanagawa (JP)

(72) Inventors: Atsumi Niwa, Kanagawa (JP); Shizunori Matsumoto, Kanagawa (JP); Eiji Hirata, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/464,956

(22) PCT Filed: Oct. 27, 2017

(86) PCT No.: PCT/JP2017/038835
§ 371 (c)(1),
(2) Date: May 29, 2019

(87) PCT Pub. No.: WO2018/116633
PCT Pub. Date: Jun. 28, 2018

(65) Prior Publication Data
US 2020/0021769 A1   Jan. 16, 2020

(30) Foreign Application Priority Data

Dec. 22, 2016 (JP) .................................. 2016-248553

(51) Int. Cl.
*H04N 5/3745*  (2011.01)
*H04N 5/369*   (2011.01)
(Continued)

(52) U.S. Cl.
CPC ......... *H04N 5/37455* (2013.01); *H04N 5/341* (2013.01); *H04N 5/36963* (2018.08); *H04N 5/3741* (2013.01)

(58) Field of Classification Search
CPC .......... H04N 5/37455; H04N 5/36963; H04N 5/341; H04N 5/3741; H04N 5/3651;
(Continued)

(56) References Cited

U.S. PATENT DOCUMENTS

| | | | |
|---|---|---|---|
| 2010/0060768 A1* | 3/2010 | Ukita | ..................... H04N 5/378 348/311 |
| 2010/0194935 A1* | 8/2010 | Okado | .................. H04N 5/361 348/243 |

(Continued)

FOREIGN PATENT DOCUMENTS

| | | |
|---|---|---|
| JP | 2011-040807 A | 2/2011 |
| JP | 2012-109794 A | 6/2012 |

(Continued)

OTHER PUBLICATIONS

International Search Report and Written Opinion of PCT Application No. PCT/JP2017/038835, dated Jan. 30, 2018, 12 pages of ISRWO.

*Primary Examiner* — Padma Haliyur
(74) *Attorney, Agent, or Firm* — Chip Law Group

(57) ABSTRACT

The present technology is provided to accurately correct uneven luminance while suppressing an increase in the size of the solid-state imaging element. A pixel array unit includes a plurality of lines each including a predetermined number of pixels each being arrayed in a predetermined (Continued)

direction. An analog-to-digital conversion unit includes more than the predetermined number of analog-to-digital converters that convert analog signals into digital signals. A scanning circuit controls to sequentially select the plurality of lines and output more than the predetermined number of analog signals to the analog-to-digital conversion unit every time the line is selected. A correction unit performs black level correction processing on the digital signal.

11 Claims, 21 Drawing Sheets

(51) Int. Cl.
　　*H04N 5/341*　　　(2011.01)
　　*H04N 5/374*　　　(2011.01)
(58) Field of Classification Search
　　CPC ........ H04N 5/374; H04N 5/361; H04N 5/376; H04N 5/378
　　See application file for complete search history.

(56) References Cited

U.S. PATENT DOCUMENTS

| | | |
|---|---|---|
| 2012/0120286 A1 | 5/2012 | Egawa |
| 2015/0036028 A1* | 2/2015 | Tanaka ................... H04N 5/361 348/248 |
| 2015/0098117 A1* | 4/2015 | Marumoto ........... H04N 1/4076 358/474 |
| 2017/0041565 A1 | 2/2017 | Kondo |
| 2017/0126999 A1* | 5/2017 | Elikhis ................. H04N 5/3658 |
| 2018/0070034 A1* | 3/2018 | Kimura ................ H04N 5/3742 |
| 2019/0082129 A1* | 3/2019 | Kato .................. H04N 5/37455 |

FOREIGN PATENT DOCUMENTS

| | | |
|---|---|---|
| JP | 2015-104102 A | 6/2015 |
| JP | 2015-213257 A | 11/2015 |
| JP | 2016-111641 A | 6/2016 |
| WO | 2015/166900 A1 | 11/2015 |

* cited by examiner

SOLID-STATE IMAGING ELEMENT, ELECTRONIC DEVICE, AND METHOD FOR CORRECTING UNEVEN LUMINANCE

CROSS REFERENCE TO RELATED APPLICATIONS

This application is a U.S. National Phase of International Patent Application No. PCT/JP2017/038835 filed on Oct. 27, 2017, which claims priority benefit of Japanese Patent Application No. JP 2016-248553 filed in the Japan Patent Office on Dec. 22, 2016. Each of the above-referenced applications is hereby incorporated herein by reference in its entirety.

TECHNICAL FIELD

The present technology relates to a solid-state imaging element, an electronic device, and a method for controlling the solid-state imaging element. The present technology more particularly relates to a solid-state imaging element and an electronic device configured to correct pixel data, and a method for controlling the solid-state imaging element.

BACKGROUND ART

Conventionally, a solid-state imaging element such as a complementary MOS (CMOS) or a charge coupled device (CCD) is used to generate image data in an imaging apparatus. In this solid-state imaging element, variations in characteristics of each of pixels and voltage fluctuations sometimes cause uneven luminance. In particular, the line-shaped uneven luminance is referred to as streaks. In order to suppress these streaks, a solid-state imaging element has been proposed in which optical black (OPB) pixels are arranged on the left and right sides of a pixel array of effective pixels when the horizontal direction is defined as a left-right direction (refer to Patent Document 1, for example).

CITATION LIST

Patent Document

Patent Document 1: Japanese Patent Application Laid-Open No. 2016-111641

SUMMARY OF THE INVENTION

Problems to be Solved by the Invention

In the known technique described above, the solid-state imaging element can suppress the streaks by correcting the pixel data of the effective pixel by using pixel data of an OPB pixel. However, arranging the OPB pixels on the left and right sides of the pixel array of the effective pixels would increase the size of the solid-state imaging element in the left-right direction. On the other hand, while reducing the number of pixels of the OPB pixel can downsize the solid-state imaging element, this might lead to an inaccurate correction value, making it difficult to correct the streaks with high accuracy. In this manner, the above-described known technique has difficulty in correcting uneven luminance (streaks) with high accuracy while suppressing an increase in the size of the solid-state imaging element.

The present technology has been made in view of such a situation, and aims to correct uneven luminance with high accuracy while suppressing an increase in the size of a solid-state imaging element.

Solutions to Problems

The present technology has been made to solve the above-described problem and a first aspect of the present technology is a solid-state imaging element and a method for controlling the solid-state imaging element, the solid-state imaging element including: a pixel array unit including a plurality of lines each including a predetermined number of pixels arrayed in a predetermined direction; an analog-to-digital conversion unit that arranges more than the predetermined number of analog-to-digital converters that convert an analog signal into a digital signal; a scanning circuit that controls to sequentially select the plurality of lines and output more than the predetermined number of the analog signals to the analog-to-digital conversion unit every time the line is selected; and a correction unit that performs black level correction processing on the digital signal. This would produce an effect that analog signals, the number of the analog signals being more than the number of pixels in the line are output.

Furthermore, in the first aspect, the analog signal includes an effective pixel signal and a reference signal indicating a black level, and the analog-to-digital conversion unit may include an effective pixel signal conversion unit that converts the effective pixel signal into the digital signal and outputs the digital signal as effective pixel data, and a reference signal conversion unit that converts the reference signal into the digital signal and outputs the digital signal as reference data, and the correction unit may perform processing of obtaining a difference between the effective pixel data and the reference data, as the black level correction processing. This would produce an effect that the difference between the effective pixel data and the reference data can be obtained.

Furthermore, in the first aspect, it is also allowable to further include a dummy circuit that generates the reference signal, in which the scanning circuit may drive each of the pixels in the selected line to cause the pixel to output the effective pixel signal and may cause the dummy circuit to output the reference signal every time the line is selected. This would produce an effect of correcting the effective pixel data on the basis of the reference data obtained by converting the reference signal from the dummy circuit.

Furthermore, in the first aspect, the analog-to-digital conversion unit includes a plurality of the reference signal conversion units and a plurality of the effective pixel signal conversion units, and each of the reference signal conversion units may be arranged dispersedly between each of the effective pixel signal conversion units. This would produce an effect of correcting the effective pixel data on the basis of the reference data obtained by converting the reference signal from the reference signal conversion units dispersedly arranged.

Furthermore, in the first aspect, the pixel array unit may include effective pixels for generating the effective pixel signal and light-shielding pixels for generating the reference signal, being arrayed as the pixels. This would produce an effect of correcting the effective pixel data on the basis of the reference data obtained by converting the reference signal from the light-shielding pixels.

Furthermore, in the first aspect, the plurality of lines may include a plurality of effective pixel lines in which the predetermined number of the effective pixels are arrayed in the predetermined direction, and a light-shielding pixel line in which the predetermined number of the light-shielding pixels are arrayed in the predetermined direction, and the scanning circuit may simultaneously select one of the plurality of effective pixel lines, and the light-shielding pixel line, and may control the selected one effective pixel line and the light-shielding pixel line to output the effective pixel signal and the reference signal, respectively. This would produce an effect of simultaneously selecting any of the effective pixel lines and the light-shielding pixel line.

Furthermore, in the first aspect, each of the plurality of lines may include the effective pixel and the light-shielding pixel, and the scanning circuit may control to output the effective pixel signals, the number of the effective pixel signals being equal to the number of effective pixels in the selected line, and may control to output the reference signals, the number of the reference signals being more than the number of light-shielding pixels in the selected line. This would produce an effect that the effective pixel signals, the number of the effective pixel signals being equal to the number of effective pixels, are output and the reference signals, the number of the reference signals being more than the number of light-shielding pixels in the selected line, are output.

Furthermore, in the first aspect, the analog-to-digital conversion unit and the correction unit may be arranged on the predetermined substrate, and the pixel array unit and the scanning circuit may be arranged on a substrate stacked on the predetermined substrate. This would produce an effect that an analog signal is output from the pixel array unit arranged on the stacked substrate.

Furthermore, in the first aspect, the analog-to-digital conversion unit may include first and second analog-to-digital conversion units, and the scanning circuit may simultaneously select first and second lines out of the plurality of lines and may control to output the analog signal corresponding to the first line to the first analog-to-digital conversion unit and may control to output the analog signal corresponding to the second line to the second analog-to-digital conversion unit. This would produce an effect that the analog signal is simultaneously output from the first line and the second line.

Furthermore, in the first aspect, the black level correction processing may include processing of multiplying the digital signal by a correction coefficient set for each of lines. This would produce an effect that the digital signal is multiplied by the correction coefficient for each of lines.

Furthermore, a second aspect of the present technology is an electronic device including: a pixel array unit including a plurality of lines each including a predetermined number of pixels arrayed in a predetermined direction; an analog-to-digital conversion unit that arranges more than the predetermined number of analog-to-digital converters that convert an analog signal into a digital signal; a scanning circuit that controls to sequentially select the plurality of lines and output more than the predetermined number of the analog signals to the analog-to-digital conversion unit every time the line is selected; a correction unit that performs black level correction processing on the digital signal; and a signal processing unit that processes the digital signal that has undergone the black level correction processing. This would produce an effect that analog signals, the number of the analog signals being more than the number of pixels in the line, are converted into digital signals and processed.

Effects of the Invention

According to the present technology, it is possible to obtain an excellent effect of being able to accurately correct uneven luminance while suppressing an increase in the size of the solid-state imaging element. Note that effects described herein are necessarily non-restricting. The effects may be any of effects described in the present disclosure.

MODE FOR CARRYING OUT THE INVENTION

Hereinafter, embodiments of the present technology (hereinafter, embodiment(s)) will be described. The description will be given in the following order.

1. First embodiment (example of correction using signal from OPB pixel line)
2. Second embodiment (example of correction using signal from dummy circuit)
3. Third embodiment (example of correction using signal from OPB column)
4. Application example to mobile body

1. First Embodiment

[Exemplary Configuration of Electronic Device]

Figure 1:
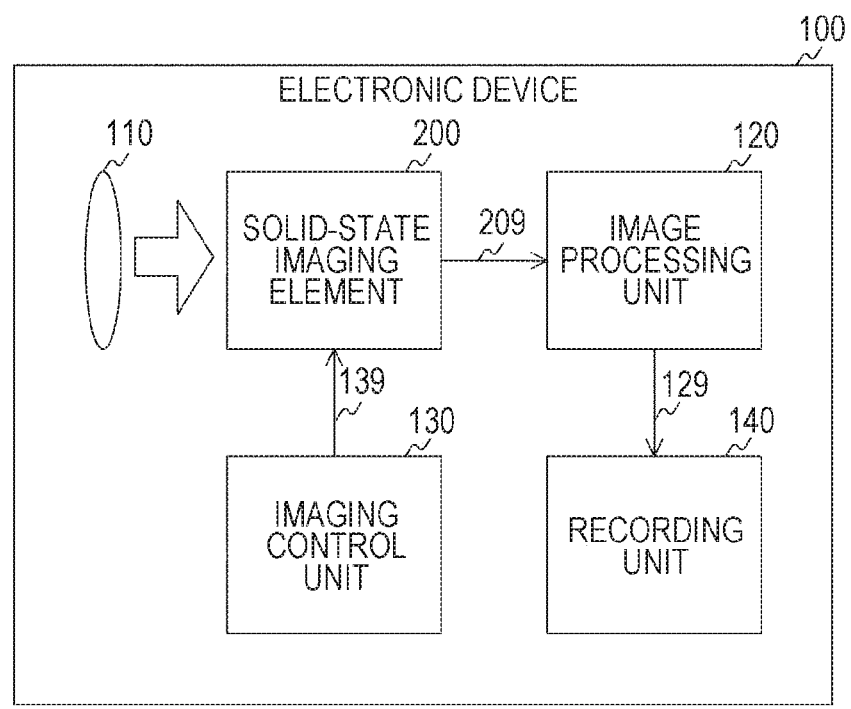
FIG. 1 is a block diagram illustrating a configuration example of an electronic device according to a first embodiment of the present technology.

FIG. 1 is a block diagram illustrating a configuration example of an electronic device 100 according to a first embodiment of the present technology. The electronic device 100 is an electronic device having an imaging function and includes an imaging lens 110, a solid-state imaging element 200, an image processing unit 120, an imaging control unit 130, and a recording unit 140. Assumable examples of the electronic device 100 include a digital camera, a smartphone, and a personal computer.

The imaging lens 110 collects light from a subject and guides the collected light to the solid-state imaging element 200.

The solid-state imaging element 200 captures image data in synchronization with a vertical synchronization signal VSYNC from the imaging control unit 130. Here, the vertical synchronization signal VSYNC is a timing signal indicating timing of imaging. For example, a periodic signal of 30 hertz (Hz) or 60 hertz (Hz) is used as the vertical synchronization signal VSYNC. The solid-state imaging element 200 supplies image data to the image processing unit 120 via a signal line 209.

The imaging control unit 130 controls the solid-state imaging element 200. The imaging control unit 130 supplies the vertical synchronization signal VSYNC, a signal for controlling the exposure time, or the like, to the solid-state imaging element 200 via the signal line 139. Furthermore, the imaging control unit 130 starts supply of the vertical synchronization signal VSYNC in response to imaging start operation (such as depression of a shutter button), for example.

The image processing unit 120 executes various types of image processing such as demosaic processing and white balance processing on image data. The image processing unit 120 supplies the processed image data to the recording unit 140 via the signal line 129. The recording unit 140 records image data. Note that the image processing unit 120 is an example of a signal processing unit described in the claims.

(Exemplary Configuration of Solid-State Imaging Element)

Figure 2:
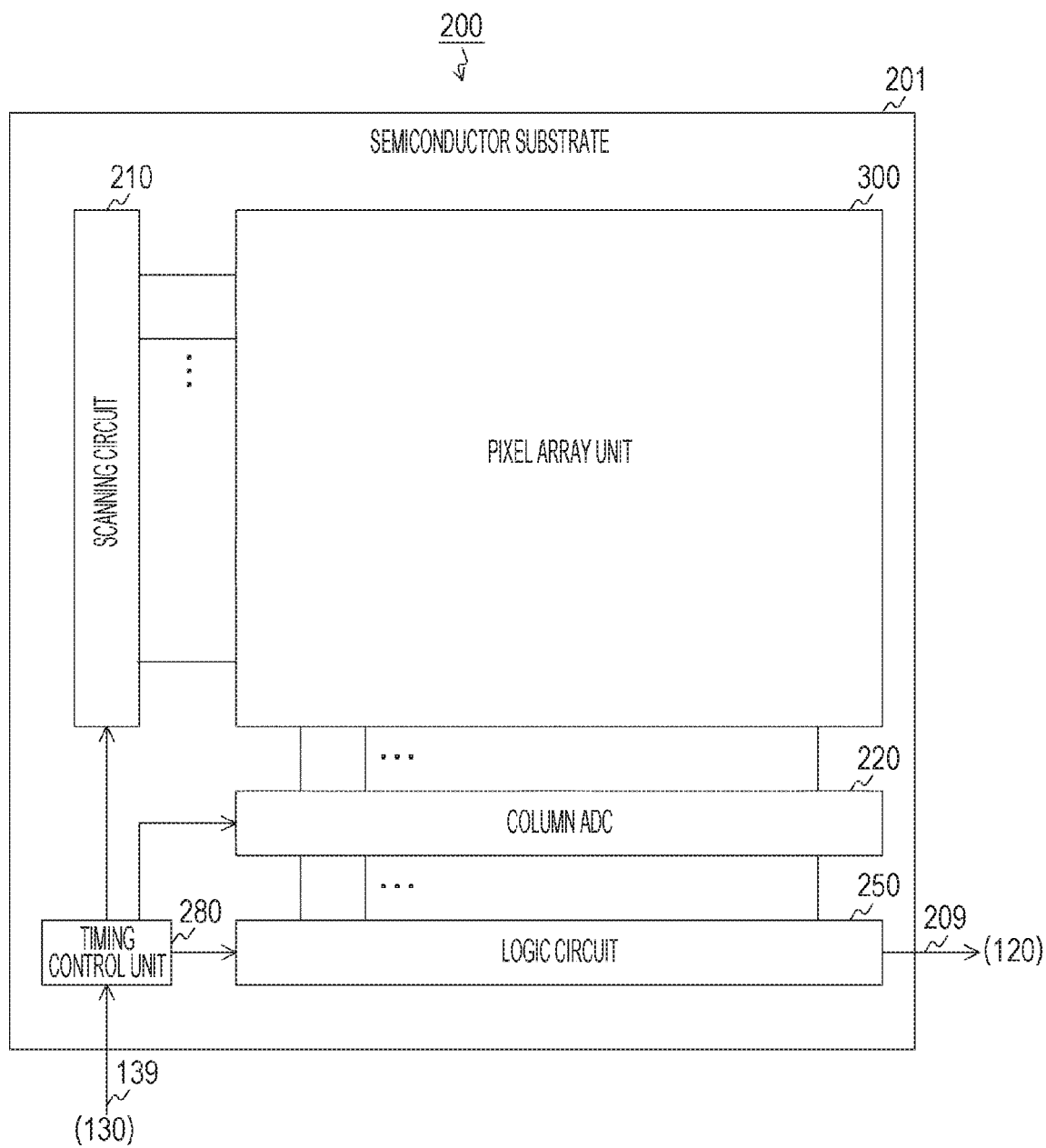
FIG. 2 is a block diagram illustrating a configuration example of a solid-state imaging element according to the first embodiment of the present technology.

FIG. 2 is a block diagram illustrating a configuration example of the solid-state imaging element 200 according to the first embodiment of the present technology. The solid-state imaging element 200 includes a semiconductor substrate 201. The semiconductor substrate 201 includes a scanning circuit 210, a pixel array unit 300, a column ADC 220, a logic circuit 250, and a timing control unit 280.

The pixel array unit 300 includes a plurality of pixels arrayed in a two-dimensional lattice pattern. Hereinafter, a set of pixels arrayed in a predetermined direction will be referred to as "row" or "line", and a set of pixels arrayed in a direction perpendicular to the row will be referred to as "column". Furthermore, the pixel array unit 300 includes effective pixels that are not optically shielded and OPB pixels that are optically shielded, as arrayed pixels. The respective arrangement locations of effective pixels and OPB pixels will be described later.

The timing control unit 280 controls individual operation timings of the scanning circuit 210, the column ADC 220, and the logic circuit 250 in synchronization with the vertical synchronization signal VSYNC.

The scanning circuit 210 sequentially selects rows and drives the pixels in the selected row. Each of the driven pixels supplies an analog pixel signal to the column ADC 220.

The column ADC 220 converts each of pixel signals into a digital signal and outputs the digital signal to the logic circuit 250 as pixel data.

The logic circuit 250 performs black level correction processing for suppressing streaks on each of pixel data. The logic circuit 250 supplies the image data including the processed pixel data to the image processing unit 120. Note that the logic circuit 250 is an example of a correction unit described in the claims.

Figure 3:
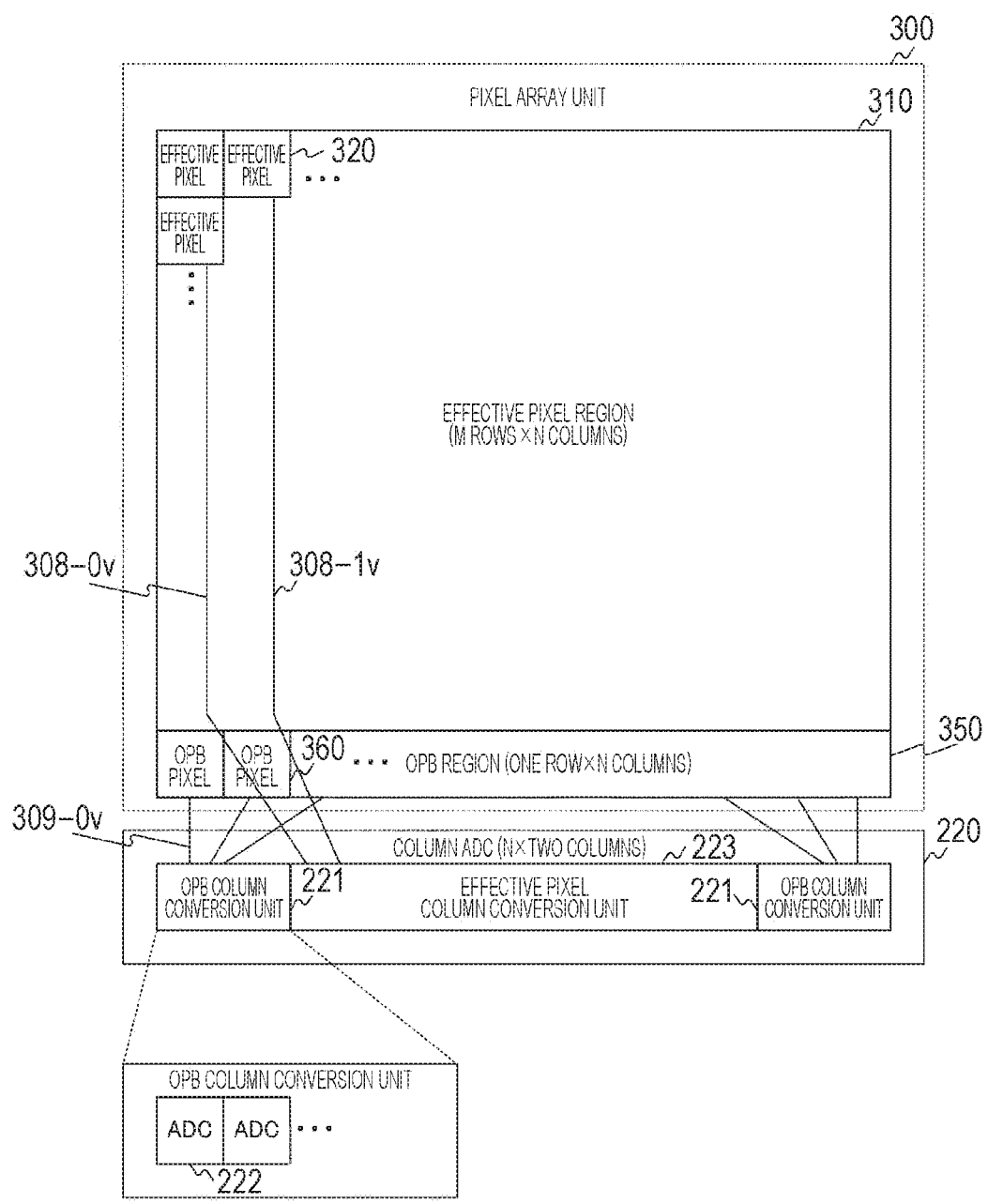
FIG. 3 is a block diagram illustrating a configuration example of a pixel array unit and a column analog-to-digital converter (ADC) according to the first embodiment of the present technology.

FIG. 3 is a block diagram illustrating a configuration example of the pixel array unit 300 and the column ADC 220 in the first embodiment of the present technology. The pixel array unit 300 is divided into an effective pixel region 310 and an OPB region 350.

The effective pixel region 310 includes a plurality of effective pixels 320 arrayed in a two-dimensional lattice pattern. The effective pixels 320 includes M (M is an integer) rows and N (N is an integer) columns. Furthermore, the effective pixel region 310 includes a vertical signal line 308-$n$ (n is an integer from 0 to N−1) v wired for each of the columns. Each of the effective pixels 320 in the n-th column is connected to a vertical signal line 308-$nv$.

The OPB region 350 is arranged adjacent to the upper or lower side of the effective pixel region 310 on the basis of the column direction of the effective pixel region 310 defined as the vertical direction. For example, the OPB region 350 is arranged on the lower side of the effective pixel region 310 when the column ADC 220 side is defined as the lower side. The OPB region 350 includes N OPB pixels 360 being arrayed in the row direction. Furthermore, the OPB region 350 is wired with vertical signal lines 309-$nv$ for each of the columns. The OPB pixel 360 of an n-th column is connected to a vertical signal line 309-$nv$. Note that the OPB pixel 360 is an example of the light-shielding pixel described in the claims.

The column ADC includes two OPB column conversion units 221 and an effective pixel column conversion unit 223. The OPB column conversion unit 221 is arranged on the left side and the right side of the effective pixel column conversion unit 223 when the row direction is defined as the left-right direction. Furthermore, each of the OPB column conversion units 221 includes N/2 ADCs 222 arrayed in the row direction. The effective pixel column conversion unit 223 includes N ADCs 222 arrayed in the row direction. That is, the column ADC 220 includes an array of N×2 ADCs 222. Note that the column ADC 220 is an example of the analog-to-digital conversion unit described in the claims. Furthermore, the OPB column conversion unit 221 is an example of the reference signal conversion unit described in the claims. The effective pixel column conversion unit 223 is an example of the effective pixel signal conversion unit described in the claims.

The ADC 222 in an $n_L$-th column of the OPB column conversion unit 221 on the left side is connected to the OPB pixel 360 in the $n_L$-th column via a vertical signal line 309-$n_L$v. Here, $n_L$ is an integer from 0 to (N/2−1). The ADC 222 in an $n_R$-th column of the OPB column conversion unit 221 on the right side is connected to the OPB pixel 360 in the $n_R$-th column via a vertical signal line 309-$n_R$v. Here, $n_R$ is an integer from N/2 to N−1.

The n-th column ADC 222 in the effective pixel column conversion unit 223 is connected to the n-th column effective pixel 320 via the vertical signal line 308-nv.

Each of the ADCs 222 converts an analog pixel signal from a corresponding vertical signal line into digital pixel data. Hereinafter, the pixel signal from the effective pixel 320 will be referred to as an "effective pixel signal", and the pixel signal from the OPB pixel 360 will be referred to as an "OPB pixel signal". This OPB pixel signal is used as a reference signal indicating black level in streak correction. Furthermore, hereinafter, the pixel data corresponding to the effective pixel signal will be referred to as "effective pixel data", and the pixel data corresponding to the OPB pixel signal will be referred to as "OPB pixel data". Note that the OPB pixel signal is an example of the reference signal described in the claims, and the OPB pixel data is an example of the reference data described in the claims.

The scanning circuit 210 sequentially selects a row of effective pixels 320 (hereinafter referred to as "effective pixel line"), and simultaneously selects a row of the OPB pixel 360 (hereinafter, "OPB pixel line") every time the effective pixel line is selected. Accordingly, every time the effective pixel line is selected, the selected effective pixel line outputs N effective pixel signals, and the OPB pixel line outputs N OPB pixel signals. Next, the column ADC 220 converts the pixel signals into N×2 pieces of pixel data and outputs the data to the logic circuit 250.

Streak components (streaks) typically occur due to voltage fluctuations, variations in characteristics of the pixel array unit 300 and the column ADC 220, or the like. Even when the voltage fluctuates in individual effective pixel lines, simultaneously driving the effective pixel line and the OPB pixel line would perform correction using signals from the OPB pixel line under the same voltage conditions, enabling suppression of the streaks due to voltage fluctuation.

Furthermore, since process and temperature conditions are the same in the effective pixel lines and OPB pixel lines, correction using signals from the OPB pixel line can suppress streaks due to variations in characteristics of the pixel array unit 300.

Furthermore, since process and temperature conditions are the same in the OPB column conversion unit 221 and the effective pixel column conversion unit 223, correction using OPB pixel data can suppress streaks due to variations in characteristics of the column ADC 220.

Furthermore, since the OPB region 350 is arranged on the lower side of the effective pixel region 310, it is possible to downsize the pixel array unit 300 in the left-right direction (row direction) as compared with the case where the OPB region 350 is arranged on the left or right side.

Configuration Example of Pixel Array Unit

Figure 4:
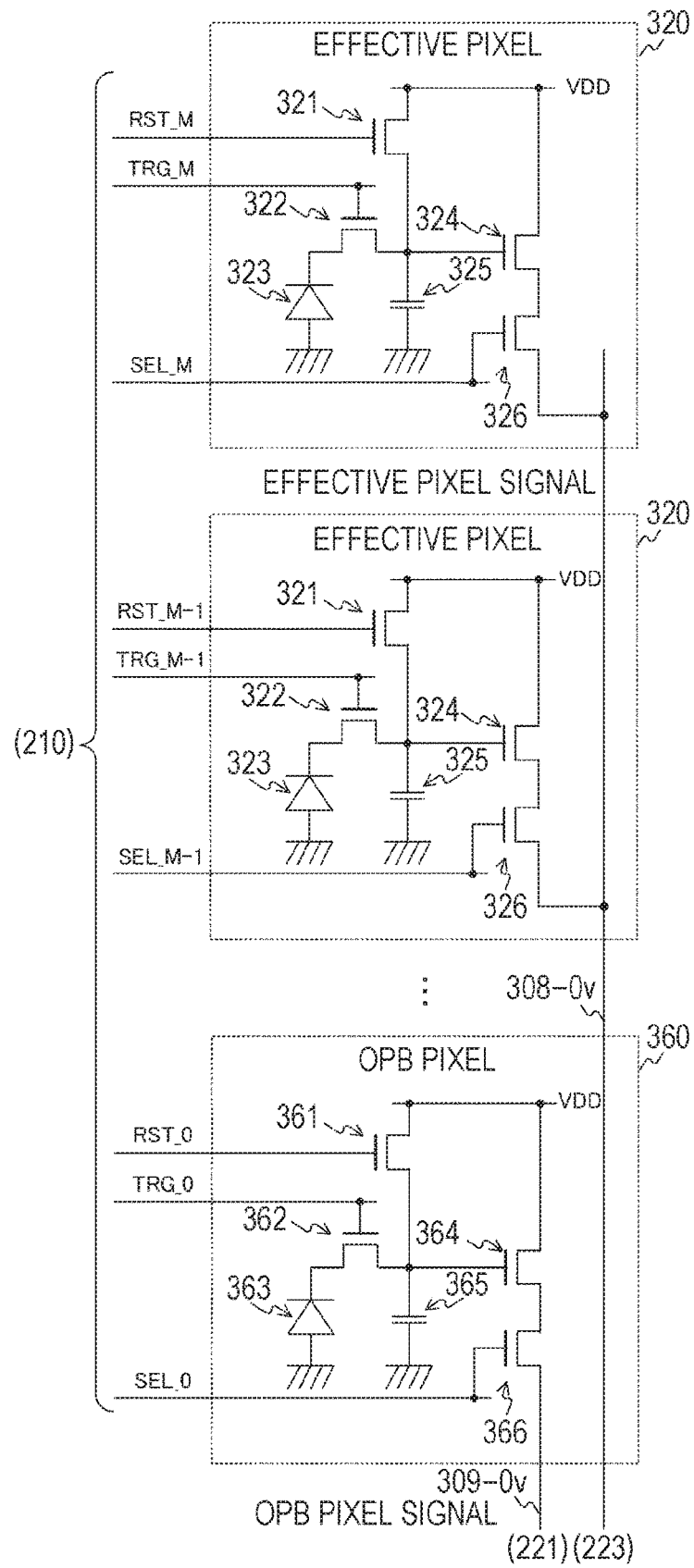
FIG. 4 is a circuit diagram illustrating a configuration example of an effective pixel and an OPB pixel according to the first embodiment of the present technology.

FIG. 4 is a circuit diagram illustrating a configuration example of an effective pixel 320 and an OPB pixel 360 according to the first embodiment of the present technology. Each of the effective pixels 320 includes a reset transistor 321, a transfer transistor 322, a photodiode 323, an amplification transistor 324, a floating diffusion layer 325, and a selection transistor 326.

The photodiode 323 performs photoelectric conversion to generate a charge from light. The transfer transistor 322 transfers the charge generated by the photodiode 323 to the floating diffusion layer 325 in accordance with a transfer signal TRG_m (M is an integer from 0 to M).

The floating diffusion layer 325 accumulates the transferred charge and generates a voltage corresponding to the charge amount. The reset transistor 321 initializes the charge amount of the floating diffusion layer 325 in accordance with a reset signal RST_m.

The amplification transistor 324 amplifies the voltage of the floating diffusion layer 325. The selection transistor 326 outputs a signal of the amplified voltage as an effective pixel signal to the effective pixel column conversion unit 223 via the vertical signal line 308-nv in accordance with a selection signal SEL_m.

The scanning circuit 210 supplies the selection signal SEL_m to the selected line. Furthermore, the scanning circuit 210 transmits the transfer signal TRG_m and the reset signal RST_m at the start of exposure of the selected line and initializes the voltage. Thereafter, the scanning circuit 210 transmits the transfer signal TRG_m to transfer the charge at the end of the exposure of the selected line.

Each of the OPB pixels 360 includes a reset transistor 361, a transfer transistor 362, a photodiode 363, an amplification transistor 364, a floating diffusion layer 365, and a selection transistor 366. The functions of these elements are similar to the functions of the effective pixels 320.

Note that the circuits of the effective pixel 320 and the OPB pixel 360 are not limited to the circuits illustrated in FIG. 4. For example, the configuration may use the floating diffusion layer shared by a plurality of pixels.

Configuration Example of Logic Circuit

Figure 5:
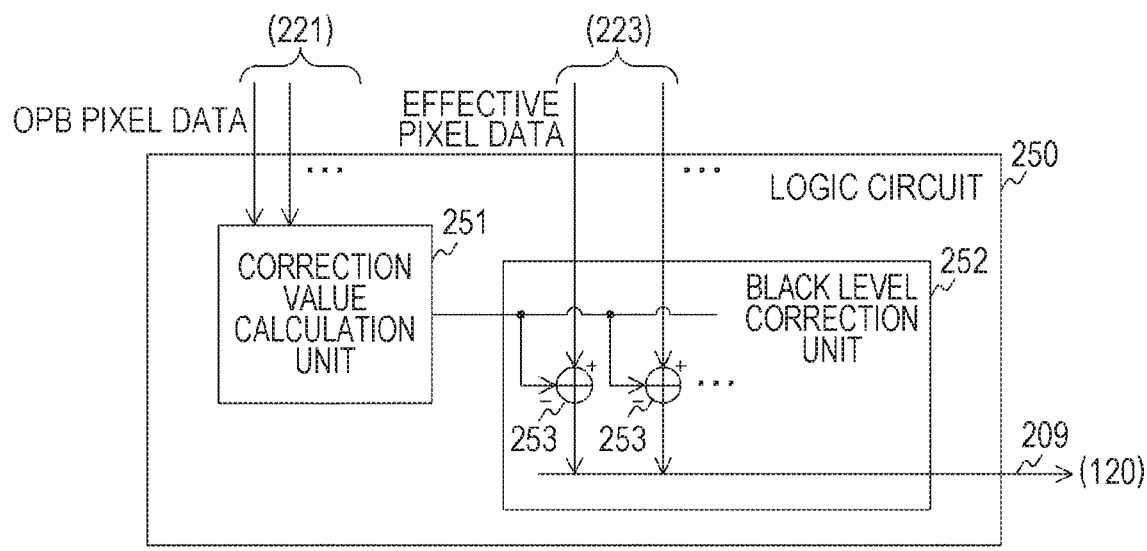
FIG. 5 is a block diagram illustrating a configuration example of a logic circuit according to the first embodiment of the present technology.

FIG. 5 is a block diagram illustrating a configuration example of the logic circuit 250 according to the first embodiment of the present technology. The logic circuit 250 includes a correction value calculation unit 251 and a black level correction unit 252. The black level correction unit 252 includes N subtractors 253.

The correction value calculation unit 251 calculates an average value of the N pieces of OPB pixel data as a correction value every time the effective pixel line is selected. The correction value calculation unit 251 supplies the correction value to the black level correction unit 252. Note that although the correction value calculation unit 251 calculates the average value as the correction value, it is also allowable to calculate a statistic amount (such as a median value) other than the average value as a correction value.

The subtractor 253 calculates a difference between the effective pixel data of the corresponding column and the correction value. The correction value is subtracted from the effective pixel data of the n-th column by the subtractor 253 for the n-th column. The subtractor 253 outputs the calculated difference as OPB-corrected effective pixel data to the image processing unit 120.

Note that the logic circuit 250 can further execute signal processing such as correlated double sampling (CDS) processing in addition to black level correction using OPB pixel data.

Figure 6:
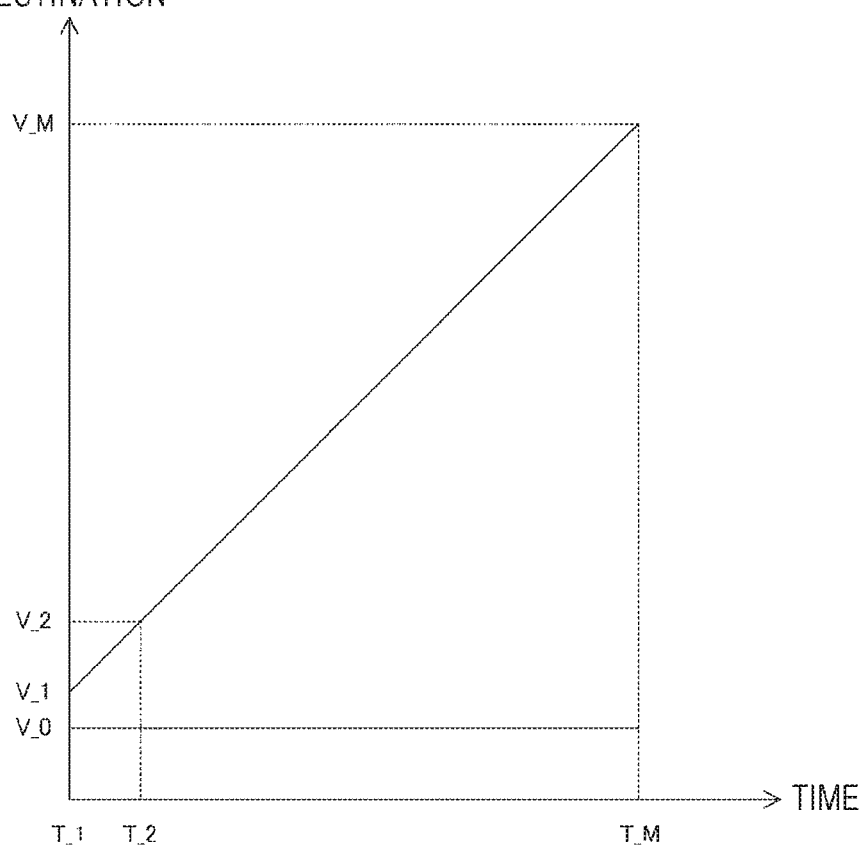
FIG. 6 is a graph illustrating an example of an order of access to lines in the first embodiment of the present technology.

FIG. 6 is a graph illustrating an example of an order of access to lines in the first embodiment of the present technology. In the figure, the vertical axis indicates the address (vertical address) of the access destination row (line) and the horizontal axis indicates time. V_0 indicates a vertical address of the OPB pixel line, and V_1 to V_M indicates vertical address of the effective pixel line.

At timing T_1 within a period of the vertical synchronization signal VSYNC, the scanning circuit 210 simultaneously accesses the addresses of V_0 and V_1. This operation simultaneously drives the OPB pixel line and the first effective pixel line.

Subsequently, at a next timing T_2, the scanning circuit 210 simultaneously accesses the addresses of V_0 and V_2. This operation simultaneously drives the OPB pixel line and the second effective pixel line. Thereafter, similarly, the scanning circuit 210 repeats processing of simultaneously accessing the address of V_0 and the address of V_3 or later.

Thereafter, at timing T_M, the scanning circuit 210 simultaneously accesses the addresses of V_0 and V_M. This operation simultaneously drives the OPB pixel line and the last effective pixel line. In this manner, one of the effective pixel lines and the OPB line are simultaneously driven. With this configuration, N×2 pixel signals are output every time an effective pixel line is selected.

The series of processing described above generates image data. In each of periods of the vertical synchronization signal VSYNC, image data is generated by similar processing.

Here, it is assumed that the OPB region 350 is arranged on the left and right of the effective pixel region 310. In this case, in order to output N×2 pixel signals every time an effective pixel line is selected, it would be necessary to arrange N rows of OPB pixels in left and right sides in total. Arranging as many as N rows of OPB pixels would double the size of the pixel array unit 300 in the left-right direction as compared with the case of the arrangement with the effective pixels alone. Similarly, the area of the pixel array unit 300 also doubled, making it difficult to downsize the solid-state imaging element 200.

In contrast, the solid-state imaging element 200 arranges the OPB pixel line on the lower side of the effective pixel region 310. Accordingly, the size of the pixel array unit 300 in the left-right direction can be as small as the case of the configuration with the effective pixels alone. Furthermore, since the OPB pixel line is one line, the size in an up-down direction of the pixel array unit 300 can be as small as (M+1)/M times, with the area being (M+1)/M times as well.

Meanwhile, even when the OPB region 350 is arranged on the left and right sides of the effective pixel region 310, reducing the number of columns of the OPB pixels could suppress the size of the unit. On the other hand, however, the number of OPB pixel signals per line would be reduced, making it difficult to perform correction with high accuracy.

In contrast, the solid-state imaging element 200 outputs many OPB pixel signals of the same number as the number of columns N of the line per effective pixel line, enabling correction with high accuracy.

Figure 7:
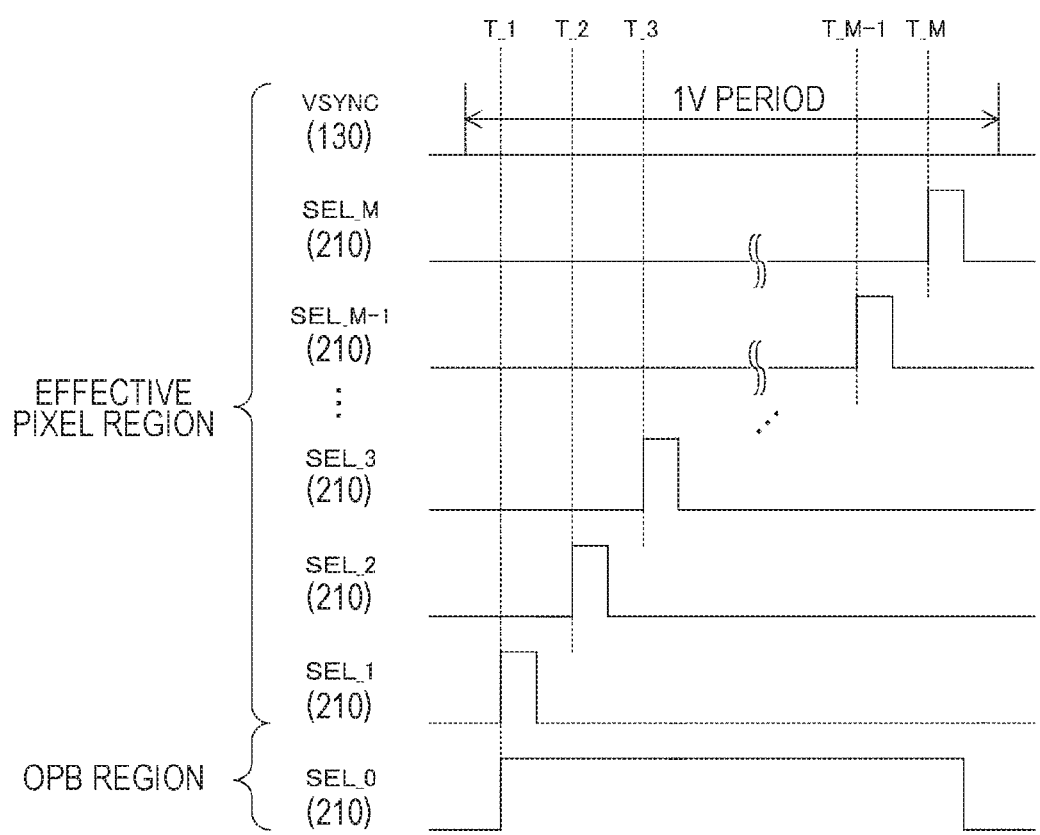
FIG. 7 is a timing chart illustrating an example of operation of a scanning circuit according to the first embodiment of the present technology.

FIG. 7 is a timing chart illustrating an example of operation of the scanning circuit 210 according to the first embodiment of the present technology. It is assumed that a period of the vertical synchronization signal corresponds to a 1V period. In the period from the timing T_1 to T_M within the 1V period, the scanning circuit 210 outputs a selection signal SEL_0 to drive the OPB pixel line. Furthermore, at the timing T_1, the scanning circuit 210 outputs a selection signal SEL_1 to drive the first effective pixel line.

The scanning circuit 210 outputs a selection signal SEL_2 to drive the second effective pixel line at the next timing T_2, and outputs a selection signal SEL_3 to drive the third effective pixel line at timing T_3. Thereafter, effective pixel lines are sequentially driven in a similar manner.

Example of Operation of Solid-State Imaging Element

Figure 8:
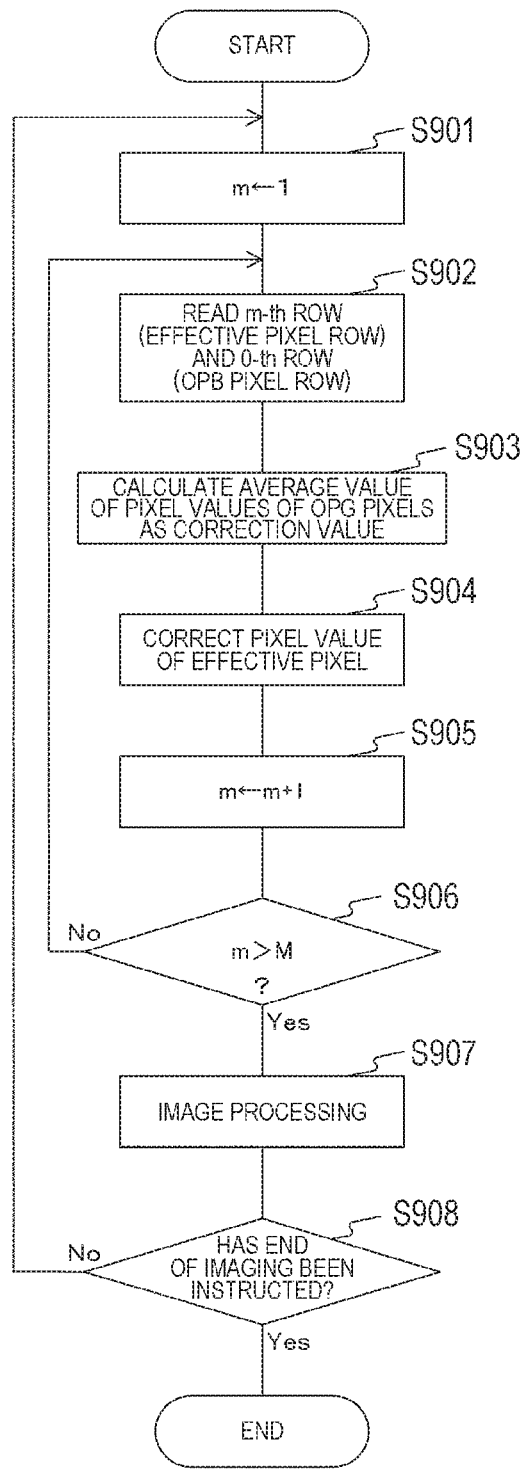
FIG. 8 is a flowchart illustrating an example of operation of the solid-state imaging element according to the first embodiment of the present technology.

FIG. 8 is a flowchart illustrating an example of operation of the solid-state imaging element according to the first embodiment of the present technology. This operation is started, for example, in response to the operation of starting imaging.

The solid-state imaging element 200 sets an initial value "1" to m (step S901). Next, the solid-state imaging element 200 simultaneously drives the m-th row (effective pixel line) and the 0-th row (OPB pixel line) to read out pixel data (step S902).

The solid-state imaging element 200 calculates an average value of the OPB pixel data as a correction value (step S903), and corrects the effective pixel data by using the correction value (step S904). The solid-state imaging element 200 increments m (step S905), and determines whether or not m is larger than M (that is, whether this is the last line) (step S906).

In a case where m is M or less (step S906: No), the solid-state imaging element 200 repeats the processing of step S902 and subsequent steps. In contrast, in a case where m is larger than M (step S906: Yes), the solid-state imaging element 200 performs image processing on the image data (step S907), and determines whether or not the imaging control unit 130 has instructed end of imaging (Step S908).

In a case where end of imaging has not been instructed (step S908: No), the solid-state imaging element 200 repeats execution of the processing of step S901 and subsequent steps. In contrast, in a case where end of imaging has been instructed (step S908: Yes), the solid-state imaging element 200 finishes imaging operation.

In this manner, according to the first embodiment of the present technology, the scanning circuit 210 outputs effective pixel signals and OPB pixel signals to each of 2N ADCs 222 that is larger than the number of columns N of effective pixel lines, making it possible to correct the streaks by the OPB pixel signal. Furthermore, since the number of columns of the effective pixels is smaller than the number 2N of the ADCs 222, it is possible to downsize the solid-state imaging element 200 compared with the case where the number of columns is 2N.

First Modification

In the first embodiment described above, the OPB column conversion unit 221 is arranged on the left and the right sides of the effective pixel column conversion unit 223 in the column ADC 220. This arrangement, however, has a possibility that it is impossible to sufficiently correct uneven luminance in a case where the uneven luminance occurs in each of the columns. The uneven luminance occurring in each of the columns is referred to as a horizontal shading component. The solid-state imaging element 200 according to a first modification of the first embodiment is different from the first embodiment in that it further corrects the horizontal shading component.

Figure 9:
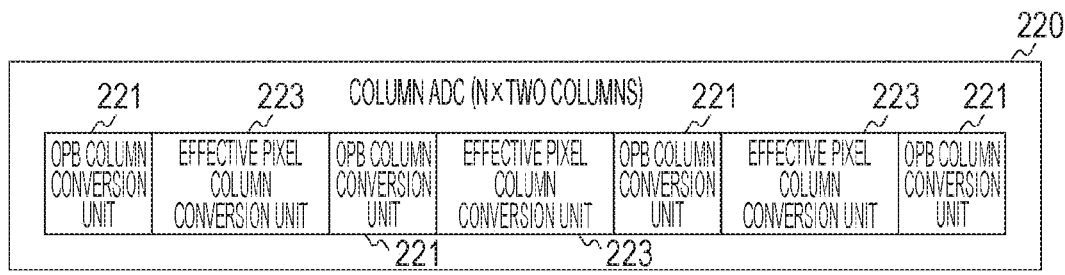
FIG. 9 is a block diagram illustrating a configuration example of a column ADC according to a first modification of the first embodiment of the present technology.

FIG. 9 is a block diagram illustrating a configuration example of the column ADC 220 according to a first modification of the first embodiment of the present technology. The column ADC 220 of the first modification of the first embodiment includes a plurality of the OPB column conversion units 221 and a plurality of the effective pixel column conversion units 223. Additionally, the OPB column conversion unit 221 is dispersedly arranged on both ends and portions between each of the effective pixel column conversion units 223. For example, in a case where three effective pixel column conversion units 223 and four OPB column conversion units 221 are arranged, two OPB column conversion units 221 among these are arranged at both ends. Furthermore, the remaining two OPB column conversion units 221 are arranged individually between the three effective pixel column conversion units 223.

The black level correction unit 252 corrects the effective pixel data for each of the effective pixel column conversion units 223 by using the OPB pixel data from the OPB column conversion unit 221 adjacent to the effective pixel column conversion unit 223. For example, the effective pixel data of the leftmost effective pixel column conversion unit 223 is corrected by an average value of the OPB pixel data from the leftmost OPB column conversion unit 221 and the second leftmost OPB column conversion unit 221.

Figure 10A:
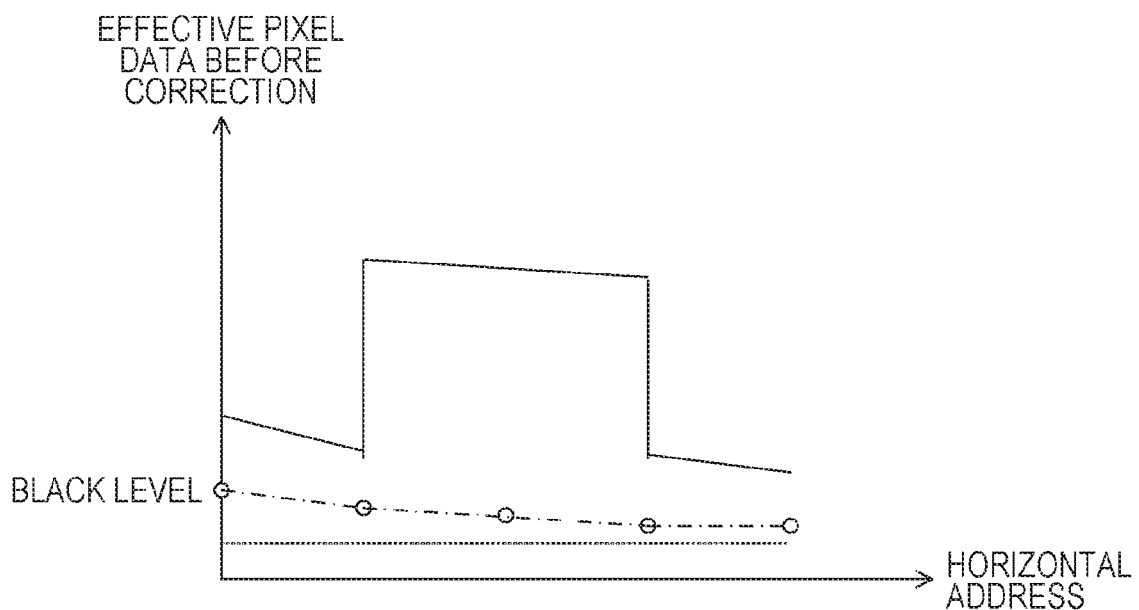
FIGS. 10A and 10B are graphs illustrating an example of effective pixel data before and after correction according to the first modification of the first embodiment of the present technology.
Figure 10B:
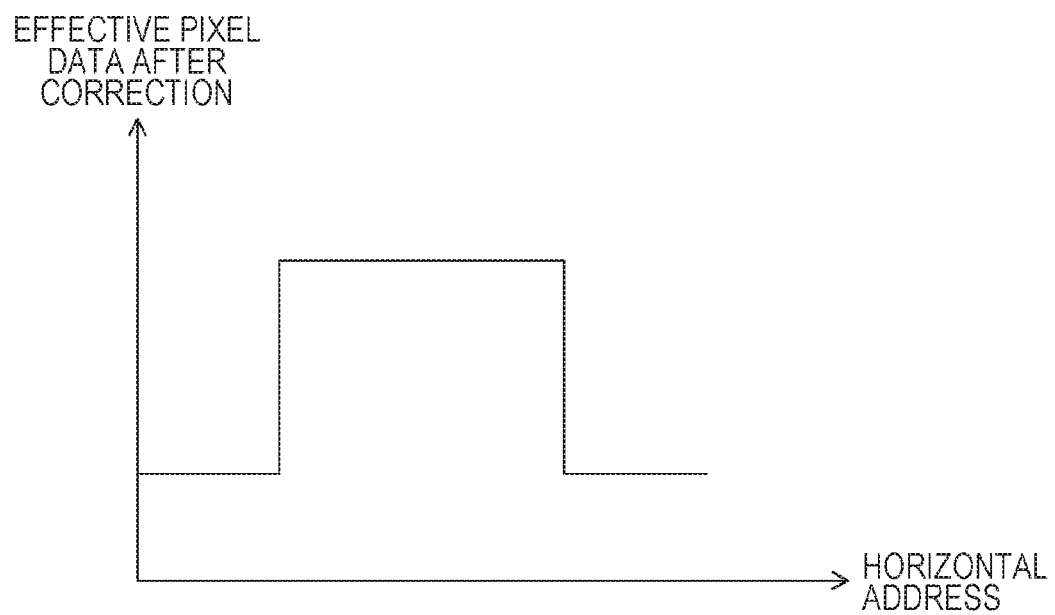

FIGS. 10A and 10B are graphs illustrating an example of effective pixel data before and after correction according to the first modification of the first embodiment of the present technology. FIG. 10A is a graph illustrating an example of effective pixel data for each of columns before black level correction, and b FIG. 10B is a graph indicating an example of effective pixel data for each of columns after black level correction. Moreover, in the figure, the vertical axis represents a luminance value of the effective pixel data, and the horizontal axis represents a horizontal address being a column address. The value on the dotted line represents a true black level. Furthermore, the open circle indicates an average value (correction value) of the OPB pixel data of the OPB column conversion unit 221. The solid line indicates a luminance value of the effective pixel data.

As illustrated in FIG. 10A, before the black level correction, the average value of the OPB pixel data in the left-side columns is relatively higher than the value on the right side. According, the luminance of the left-side columns as a whole is higher than the luminance on the right side. In other words, a horizontal shading component representing uneven luminance for each of columns is present. As illustrated in FIG. 10B, execution of correction by using the correction values (open circles) of the dispersedly arranged OPB column conversion unit 221 enables correction of the horizontal shading component.

In this manner, the OPB column conversion unit 221 is dispersedly arranged in the first modification of the first embodiment of the present technology, enabling the solid-state imaging element 200 to correct the horizontal shading component by using the correction values of the OPB column conversion unit 221.

Second Modification

In the first embodiment described above, the pixel array unit 300 and the column ADC 220 are arranged on one semiconductor substrate 201. However, provided that the area of the semiconductor substrate 201 is constant, there would be a need to further miniaturize the pixels together with the increase in the number of pixels. This miniaturization would reduce the area of a photodiode of each of the pixels, making it difficult to maintain pixel characteristics such as sensitivity. To handle this, dispersedly arranging the pixel array unit 300 or the like on a plurality of stacked substrates would be able to suppress degradation of pixel characteristics (sensitivity or the like) due to miniaturization. The solid-state imaging element 200 according to the second modification of the first embodiment is different from that of the first embodiment in that the pixel array unit 300 and the column ADC 220 are dispersedly arranged on a plurality of stacked semiconductor substrates.

Figure 11:
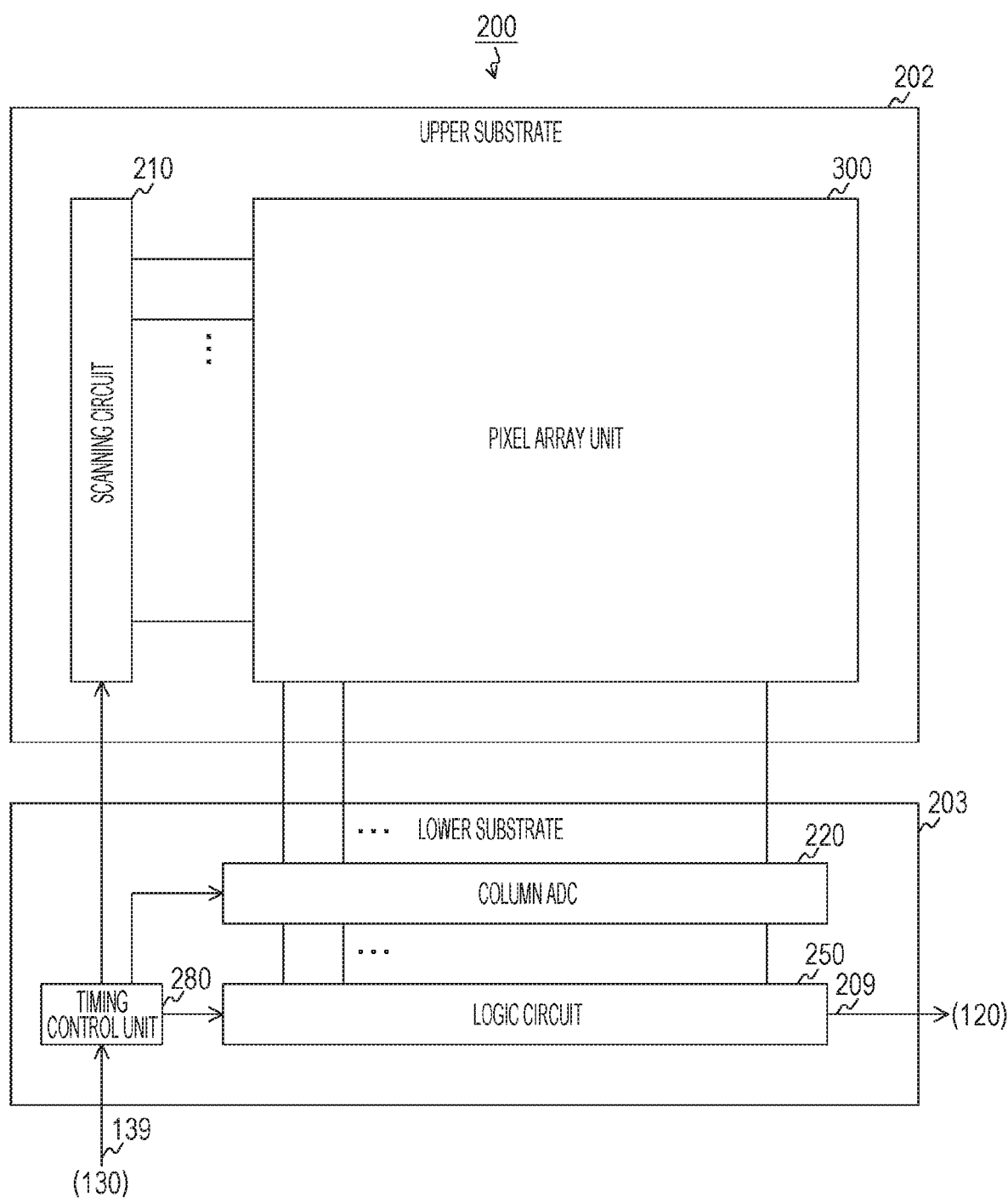
FIG. 11 is a block diagram illustrating a configuration example of a solid-state imaging element according to a second modification of the first embodiment of the present technology.

FIG. 11 is a block diagram illustrating a configuration example of the solid-state imaging element 200 according to the second modification of the first embodiment of the present technology. The solid-state imaging element 200 according to the second modification of the first embodiment includes an upper substrate 202 and a lower substrate 203. These substrates are stacked with each other.

The upper substrate 202 includes the scanning circuit 210 and the pixel array unit 300, for example. The lower substrate 203 includes the column ADC 220, the logic circuit 250, and the timing control unit 280, for example.

Note that although the scanning circuit 210 and the pixel array unit 300 are arranged on the upper substrate 202 and the rest on the lower substrate 203, the present technology is not limited to this configuration. For example, it is allowable to arrange the pixel array unit 300 alone on the upper substrate 202, and the rest on the lower substrate 203.

In this manner, in the second modification of the first embodiment of the present technology, the pixel array unit 300 and the column ADC 220 are dispersedly arranged on the plurality of stacked substrates, making it possible to suppress degradation of the pixel characteristics due to miniaturization.

Third Modification

In the first embodiment described above, the ADC 222 for one line of effective pixels is arranged and read out line by line. This method, however, increases the time for reading out all the lines together with the increase in the number of lines. The solid-state imaging element 200 according to the third modification of the first embodiment is different from the first embodiment in that the time for reading out all lines has been reduced.

Figure 12:
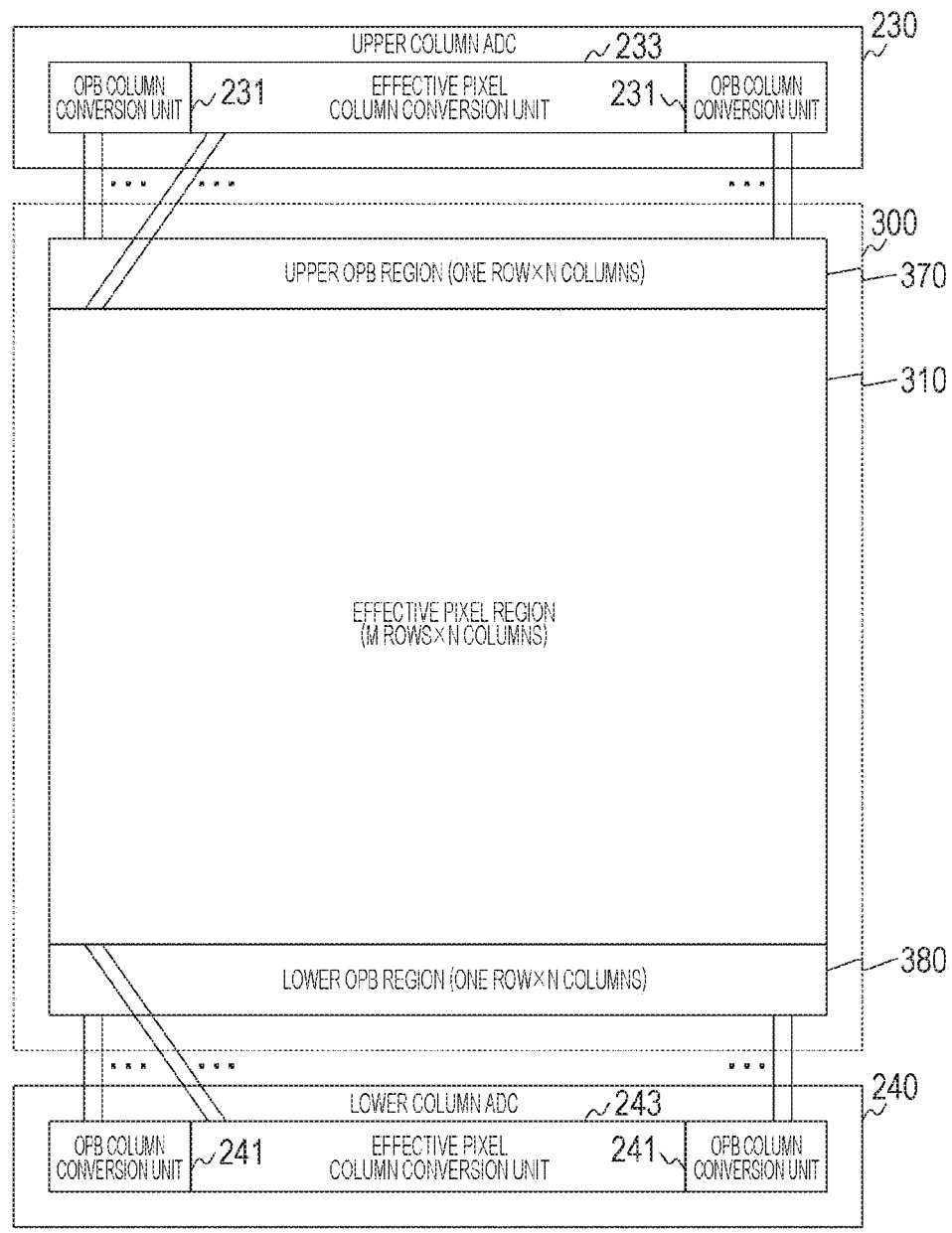
FIG. 12 is a block diagram illustrating a configuration example of a pixel array unit and a column ADC in a third modification of the first embodiment of the present technology.

FIG. 12 is a block diagram illustrating a configuration example of a pixel array unit 300 and a column ADC in a third modification of the first embodiment of the present technology. The pixel array unit 300 according to the third modification of the first embodiment includes an upper OPB region 370 and a lower OPB region 380, instead of the OPB region 350. Furthermore, the solid-state imaging element 200 of the third modification includes an upper column ADC 230 and a lower column ADC 240, instead of the column ADC 220. Note that the upper column ADC 230 is an example of the first analog-to-digital conversion unit described in the claims, and the lower column ADC 240 is an example of the second analog-to-digital conversion unit described in the claims.

Each of the upper OPB region 370 and the lower OPB region 380 includes N OPB pixels arrayed in the row direction. Furthermore, the upper OPB region 370 is arranged above the effective pixel region 310 and the lower OPB region 380 is arranged on the lower side of the effective pixel region 310 when the column direction is defined as the up-down direction.

The scanning circuit 210 simultaneously selects two lines (for example, one odd line and one even line) of the effective pixel region 310 and one of the upper OPB pixel line and the lower OPB pixel line, respectively. The selected odd line within the effective pixel region 310 and the upper OPB pixel line respectively output N effective pixel signals and N OPB pixel signals to the upper column ADC 230. In addition, the selected even line within the effective pixel region 310 and the lower OPB pixel line respectively output N effective pixel signals and N OPB pixel signals to the lower column ADC 240.

Each of the upper column ADC 230 and the lower column ADC 240 includes N×2 ADCs arranged similarly to the column ADC 220 of the first embodiment. Each of the upper column ADC 230 and the lower column ADC 240 converts the input N×2 pixel signals (effective pixel signal and OPB pixel signal) into digital signals.

Note that although the solid-state imaging element 200 simultaneously reads out two lines of the effective pixel region 310, it is also allowable to simultaneously read out three or more lines. In a case where four lines are to be read out simultaneously, for example, it would be sufficient to provide four column ADCs and four OPB pixel lines.

In this manner, according to the third modification of the first embodiment of the present technology, since the two lines of the effective pixel region 310 are simultaneously read out, it is possible to reduce the time for reading out all the lines as compared with the case of reading out one line at a time.

Fourth Modification

In the above-described first embodiment, the solid-state imaging element 200 corrects the effective pixel data by using the average value (correction value) of the OPB pixel data read out simultaneously with the effective pixel data. However, in a case where an offset component is generated, besides the correction value of the OPB pixel data, due to the characteristic variation of the effective pixel or the like, it would be difficult to correct the offset component simply by the correction value. For example, in a case where an offset component is generated for each of rows, uneven luminance occurs for each of the rows, and this component is referred to as a vertical shading component. The solid-state imaging element 200 according to a fourth modification of the first embodiment is different from the first embodiment in that it further corrects the vertical shading component.

Figure 13:
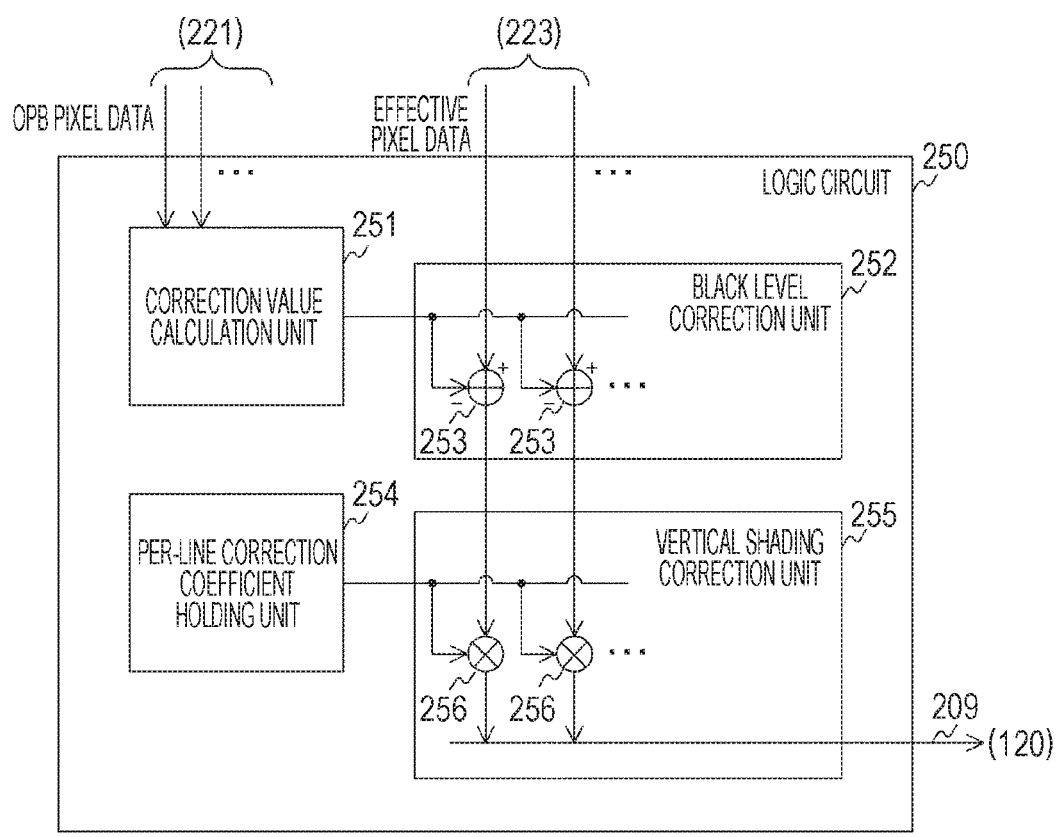
FIG. 13 is a block diagram illustrating a configuration example of a logic circuit according to a fourth modification of the first embodiment of the present technology.

FIG. 13 is a block diagram illustrating a configuration example of the logic circuit 250 according to the fourth modification of the first embodiment of the present technology. The logic circuit 250 according to the fourth modification of the first embodiment is different from the first embodiment in that it further includes a per-line correction coefficient holding unit 254 and a vertical shading correction unit 255.

The per-line correction coefficient holding unit 254 holds a correction coefficient for correcting an offset component for each of the effective pixel lines. This correction coefficient is obtained, for example, in a test at the time of shipment or the like and held in advance. Additionally, every time an effective pixel line is selected, the vertical shading correction unit 255 reads out the correction coefficient corresponding to that line.

The vertical shading correction unit 255 includes N multipliers 256. The multiplier 256 of the n-th (n is an integer from 0 to N−1) column multiplies the OPB-corrected effective pixel data of the n-th column by the correction coefficient corresponding to the effective pixel line. Next, the multiplier 256 supplies the multiplied data to the image processing unit 120 as vertical shading-corrected pixel data.

Note that although the vertical shading correction unit 255 uses the previously held correction coefficients, the vertical shading correction unit 255 may obtain the correction coefficient from an average value of the effective pixel lines at the time of imaging.

In this manner, in the fourth modification of the first embodiment of the present technology, the OPB-corrected pixel data is multiplexed by the corresponding correction coefficient for each of the effective pixel lines, it is possible to correct the vertical shading component.

Fifth Modification

In the fourth modification of the first embodiment described above, the ADC 222 for one line of effective pixels is arranged and read out line by line so as to correct the vertical shading component. This method, however, would increase the time for reading out all the lines together with the increase in the number of lines. The solid-state imaging element 200 according to the fifth modification of the first embodiment is different from the fourth modification in that the time for reading out all lines has been reduced.

Figure 14:
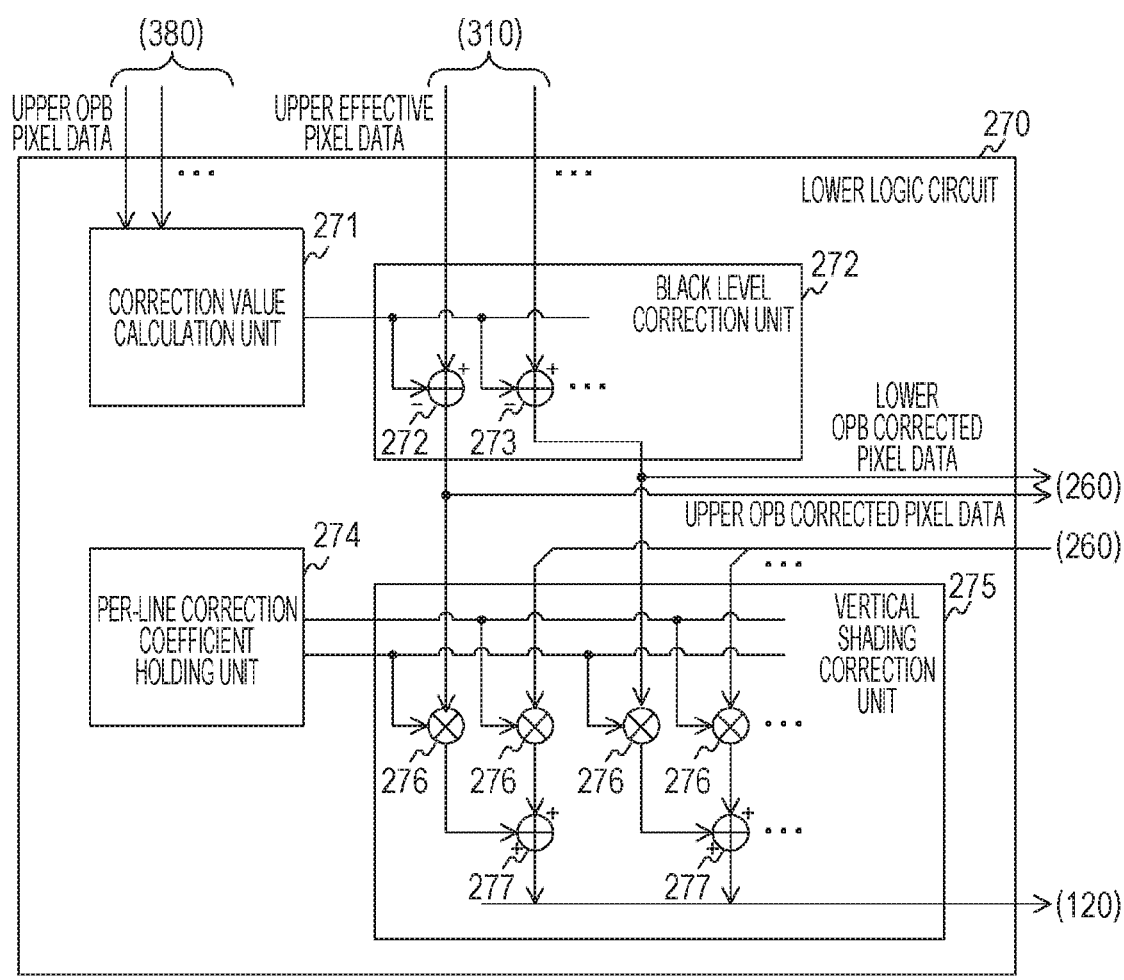
FIG. 14 is a block diagram illustrating a configuration example of a lower logic circuit according to a fifth modification of the first embodiment of the present technology.

FIG. 14 is a block diagram illustrating a configuration example of a lower logic circuit 270 according to a fifth modification of the first embodiment of the present technology. The solid-state imaging element 200 according to the fifth modification of the first embodiment includes an upper logic circuit 260 and a lower logic circuit 270, instead of the logic circuit 250.

The lower logic circuit 270 includes a correction value calculation unit 271, a black level correction unit 272, a per-line correction coefficient holding unit 274, and a vertical shading correction unit 275. The black level correction unit 272 includes N subtractors 273, corrects the effective pixel data for each of columns by using an average value of the OPB pixel data, and outputs the corrected data to the vertical shading correction unit 275 as lower OPB-corrected data.

The per-line correction coefficient holding unit 274 holds correction coefficients for each of effective pixel lines.

The vertical shading correction unit 275 includes N×2 multipliers 276 and N adders 277.

The even-numbered multiplier 276 multiplies the lower OPB-corrected pixel data of the n-th column by the correction coefficient of the corresponding even-numbered line, and supplies the multiplied value to the n-th adder 277. The odd-numbered multiplier 276 multiplies the upper OPB-corrected pixel data of the n-th column by the correction coefficient of the corresponding odd-numbered line, and supplies the multiplied value to the n-th adder 277. The n-th adder 277 adds the multiplication values from the corresponding two multipliers 276 and supplies them to the image processing unit 120 as vertical shading-corrected pixel data.

The configuration of the upper logic circuit 260 is similar to that of the lower logic circuit 270.

In this manner, the fifth modification of the first embodiment of the present technology simultaneously reads out two lines of the effective pixel region 310 and multiplies the data by the correction coefficient, making it possible to correct the vertical shading component while reducing the time for reading out all the lines.

2. Second Embodiment

In the first embodiment described above, the OPB pixel 360 having the same configuration as the effective pixel is added besides the effective pixel 320 in the pixel array unit 300. This, however, increases the size of the pixel array unit 300 due to the addition of the OPB pixel 360. The solid-state imaging element 200 according to a second embodiment is different from the first embodiment in that the pixel array unit 300 has been further downsized.

Figure 15:
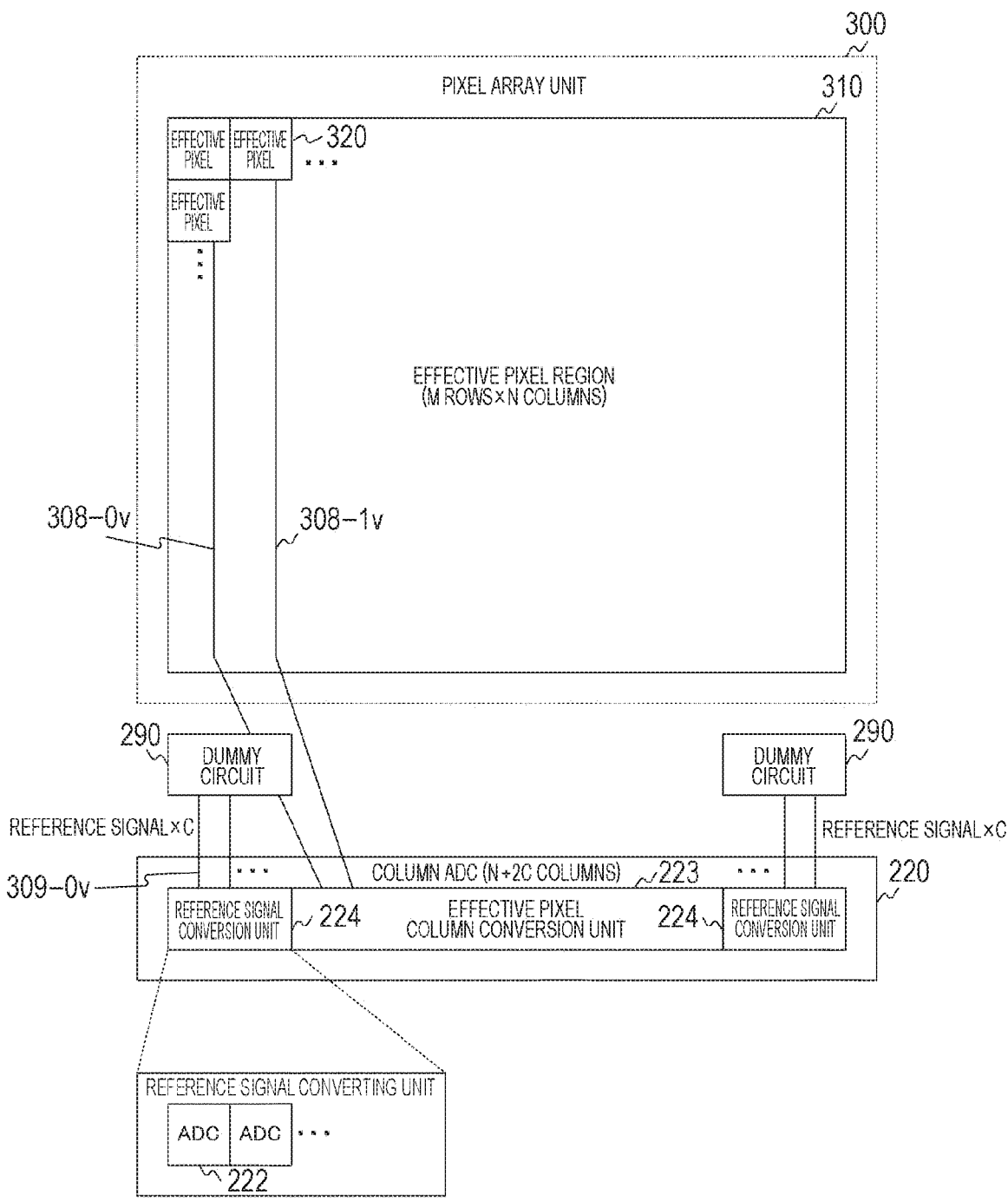
FIG. 15 is a block diagram illustrating a configuration example of a pixel array unit, a dummy circuit, and a column ADC according to a second embodiment of the present technology.

FIG. 15 is a block diagram illustrating a configuration example of the pixel array unit 300, a dummy circuit 290, and the column ADC 220 according to the second embodiment of the present technology. The solid-state imaging element 200 of the second embodiment includes two dummy circuits 290. Furthermore, the pixel array unit 300 of the second embodiment includes the effective pixel region 310 alone, with no OPB region 350 arranged.

Furthermore, the column ADC 220 of the second embodiment includes two reference signal conversion units 224 arranged instead of the two OPB column conversion units 221. The reference signal conversion unit 224 is arranged on the left and right sides of the effective pixel column conversion unit 223. The two dummy circuits 290 are arranged between the pixel array unit 300 and the column ADC 220. One of the dummy circuits 290 is connected to the left reference signal conversion unit 224, while the other is connected to the right reference signal conversion unit 224.

Each of the dummy circuits 290 outputs C predetermined reference signals to the corresponding reference signal conversion unit 224 under the control of the scanning circuit 210. This reference signal is a signal used as a reference in black level correction. For example, a signal having its correlation noise being sufficiently suppressed to about 10 µVrms (root mean square) is used as a reference signal.

Each of the two reference signal conversion units 224 arranges C (C is an integer) ADCs 222. The effective pixel column conversion unit 223 arranges N ADCs 222, similarly to the first embodiment. That is, (N+2C) ADCs 222 in total are arranged in the column ADC 220. The reference signal conversion unit 224 converts each of the C reference signals into a digital signal and outputs the signal to the logic circuit 250 as reference data. Thereafter, the logic circuit 250 corrects the effective pixel data by using the reference data instead of the OPB pixel data.

Figure 16:
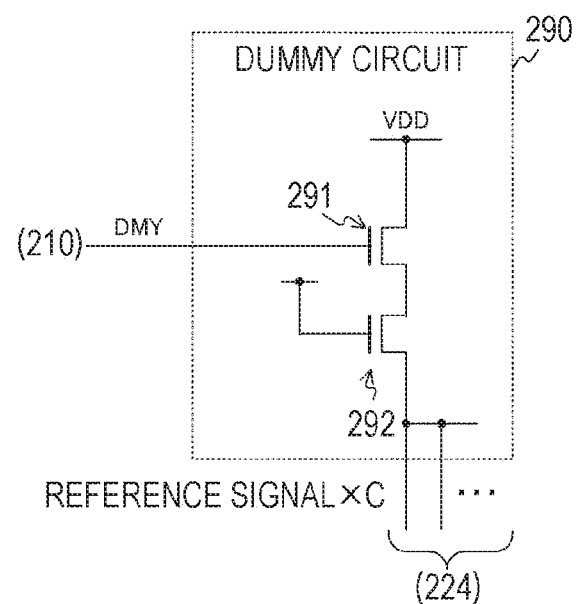
FIG. 16 is a circuit diagram illustrating a configuration example of a dummy circuit according to the second embodiment of the present technology.

FIG. 16 is a circuit diagram illustrating a configuration example of the dummy circuit 290 according to the second embodiment of the present technology. The dummy circuit 290 includes an amplification transistor 291 and a selection transistor 292. The configurations of the amplification transistor 291 and the selection transistor 292 are similar to the configurations of the amplification transistor 324 and the selection transistor 326 in the effective pixel 320. However, the vertical signal line to which the selection transistor 292 is connected is branched into C, and C reference signals are output.

The scanning circuit 210 generates a driving signal DMY having a constant voltage amplitude by a source follower or the like and inputs the generated signal to a gate of the amplification transistor 291.

Since the OPB region 350 is not provided in the pixel array unit 300 as described above, the solid-state imaging element 200 has difficulty in correcting streaks caused by process or temperature conditions of the pixel array unit 300. However, it is possible to correct the streaks caused by the voltage fluctuation and the variation of the column ADC 220 similarly to the first embodiment. Furthermore, since there is no OPB region 350, the size of the pixel array unit 300 can be reduced by that amount.

Figure 17:
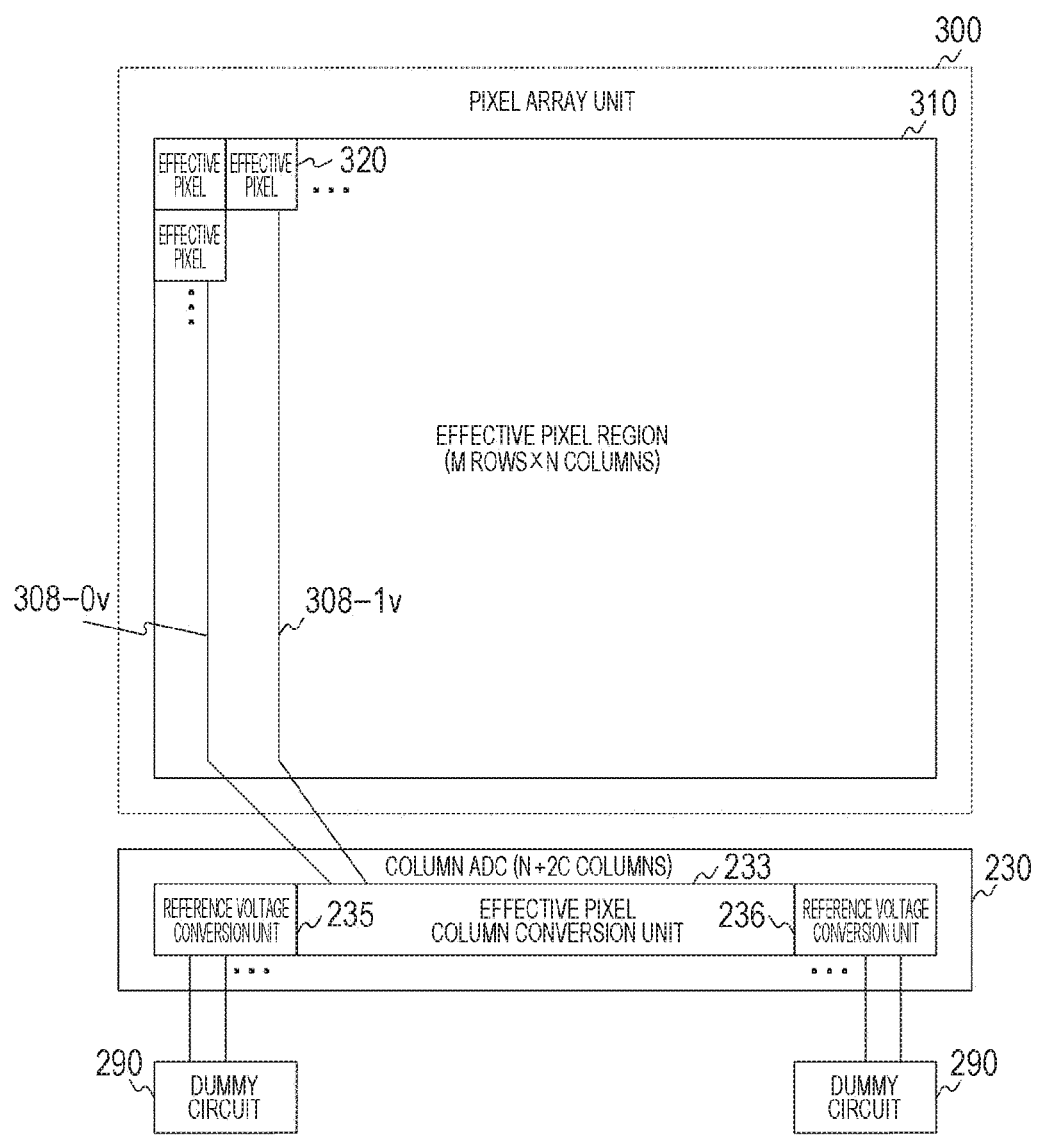
FIG. 17 is a view illustrating an arrangement example of the dummy circuit according to the second embodiment of the present technology.

Note that although the dummy circuit 290 is arranged between the column ADC 220 and the pixel array unit 300, the position of the dummy circuit 290 is not limited to this position. As illustrated in FIG. 17, the dummy circuit 290 may be arranged on the lower side of the column ADC 220.

Furthermore, each of the first to fifth modifications described above can also be applied to the solid-state imaging element 200 of the second embodiment. In a case where the second modification of the stacked structure is applied, the dummy circuit 290 is arranged on the lower substrate 203, for example. Furthermore, in a case where the third modification including the upper column ADC 230 and the lower column ADC 240 is applied, it is possible to share one dummy circuit 290 by these column ADCs.

In this manner, in the second embodiment of the present technology, the scanning circuit 210 outputs the effective pixel signal and the reference signal to each of the N+2C ADCs 222, which is larger than the number of columns N of the effective pixel lines, making it possible to correct streaks by using the reference signal. Furthermore, since the number of columns of the effective pixels is smaller than the number (N+2C) of the ADCs 222, it is possible to downsize the solid-state imaging element 200 by that amount.

3. Third Embodiment

In the first embodiment described above, the scanning circuit 210 selects OPB pixel lines and reads out these lines every time an effective pixel line is selected. This scanning method, however, doubles the number of lines to be read out as compared with the case where the effective pixel line alone is selected, leading to an increase in power consumption of the solid-state imaging element 200. Therefore, from the viewpoint of reducing power consumption, it is desirable to reduce the number of lines to be read out. The solid-state imaging element 200 according to the third embodiment is different from the first embodiment in that the number of lines to be read out has been reduced.

Figure 18:
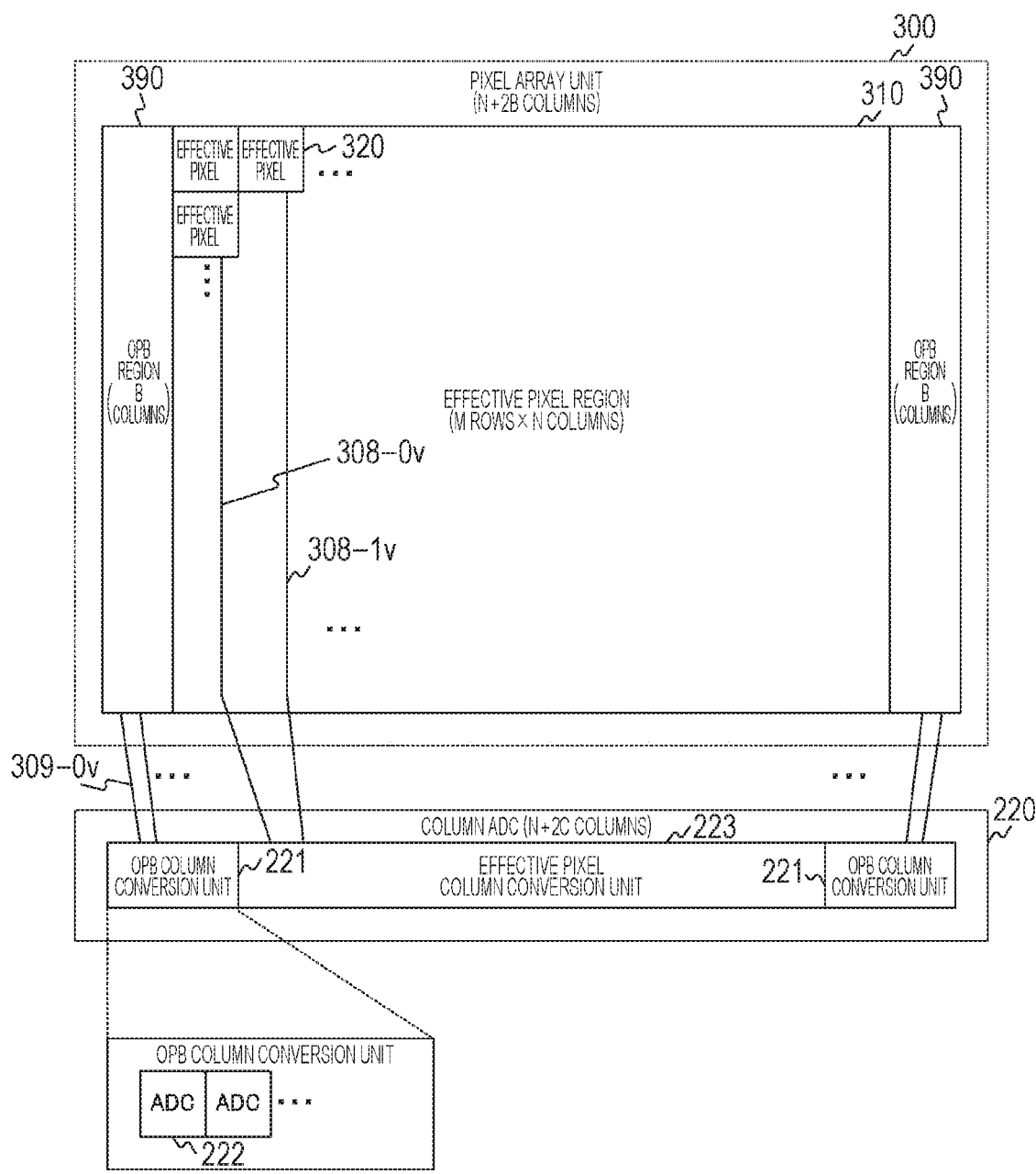
FIG. 18 is a block diagram illustrating a configuration example of a pixel array unit and a column ADC in a third embodiment of the present technology.

FIG. 18 is a block diagram illustrating a configuration example of the pixel array unit 300 and the column ADC 220 in the third embodiment of the present technology. In the pixel array unit 300 of the third embodiment, the OPB region 350 is not provided on the lower side of the effective pixel region 310. Instead, an OPB region 390 is provided on the left and right sides of the effective pixel region 310.

Each OPB region 390 includes an array of OPB pixels of M rows×B columns (B is an integer smaller than C). In addition, each time an effective pixel line is selected, the OPB region 390 generates a C pixel addition signal and supplies the signal to the OPB column conversion unit 221. Here, the pixel addition signal is a signal as a sum of B OPB pixel signals.

Each of the OPB column conversion units 221 of the third embodiment includes an array of C ADCs 222. The effective pixel column conversion unit 223 arranges N ADCs 222, similarly to the first embodiment. That is, (N+2C) ADCs 222 in total are arranged in the column ADC 220. The OPB column conversion unit 221 converts each of the C pixel addition signals into a digital signal and outputs the signal to the logic circuit 250 as pixel addition data.

Subsequently, the logic circuit 250 of the third embodiment calculates a value obtained by dividing the sum of 2C pieces of pixel addition data by (B×2C) as a correction value, and corrects the effective pixel data by using the correction value.

Figure 19:
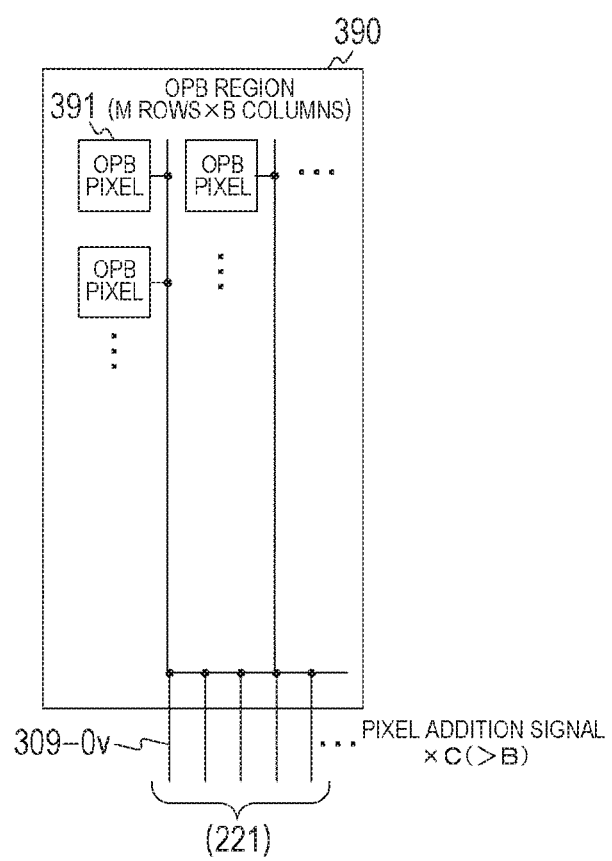
FIG. 19 is a plan view illustrating a configuration example of an OPB region according to the third embodiment of the present technology.

FIG. 19 is a plan view illustrating a configuration example of the OPB region 390 according to the third embodiment of the present technology. The OPB region 390 includes an array of OPB pixels 391 of M rows×B columns. A vertical signal line is wired for each of the columns of the OPB pixels 391. All of these vertical signal lines are connected. Accordingly, every time a line is selected, B OPB pixel signals are added in an analog manner. In addition, the vertical signal line is branched to C lines, and C pixel addition signals are output to the OPB column conversion unit 221.

Figure 20:
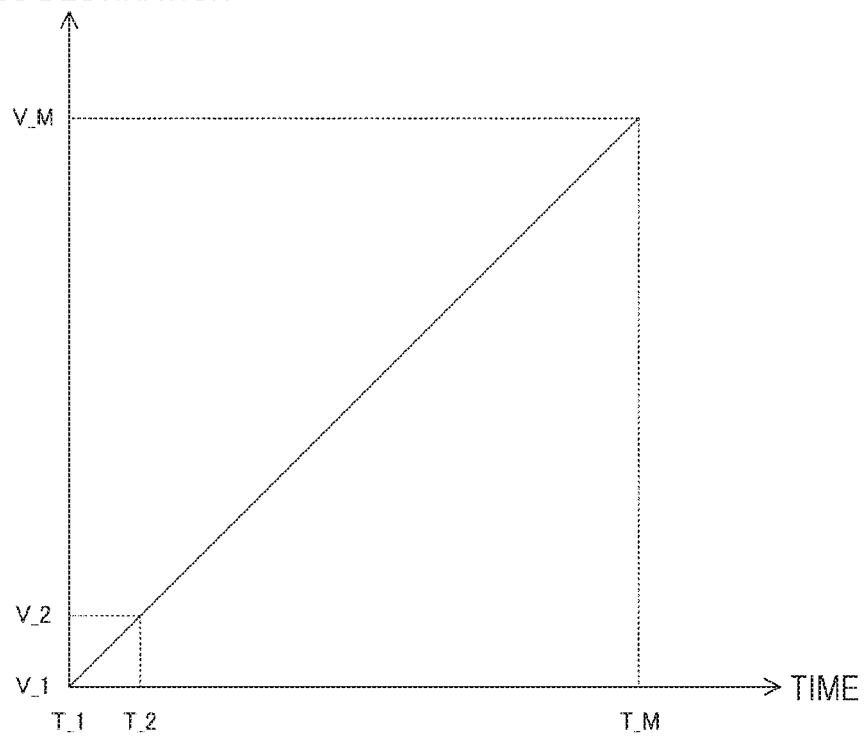
FIG. 20 is a graph illustrating an example of an order of access to lines in the third embodiment of the present technology.

FIG. 20 is a graph illustrating an example of an order of access to lines in the third embodiment of the present technology. In the figure, the vertical axis indicates the address (vertical address) of the access destination row (line) and the horizontal axis indicates time. V_1 to V_M indicate vertical address of the line.

At timing T_1, the scanning circuit 210 accesses the address V_1. This operation simultaneously drives effective pixels and OPB pixels in the line. At this time, N+2C pixel signals, the number of the N+2C pixel signals being more than the number of columns N+2B, are output. Thereafter, the scanning circuit 210 sequentially accesses address V_2 and subsequent addresses in a similar manner. While the first embodiment accesses the OPB pixel line N times, the third embodiment does not perform the access, resulting in half the number of lines as access destination.

Note that each of the first to fifth modifications described above can also be applied to the solid-state imaging element 200 of the third embodiment.

In this manner, in the third embodiment of the present technology, the scanning circuit 210 outputs the pixel signals to each of (N+2C) ADCs 222, (N+2C) being more than the number of columns (N+2B), making it possible to correct the streaks with higher accuracy than the case where the number of pixel signals is N+2B. Furthermore, since the number of columns is smaller than the number (N+2C) of the ADCs 222, it is possible to downsize the solid-state imaging element 200 than the case where the number of columns is N+2C.

4. Application Example to Mobile Body

The technology according to the present disclosure (present technology) can be applied to various products. For example, the technology according to the present disclosure may be implemented as an apparatus mounted on any type of mobile body such as an automobile, an electric vehicle, a hybrid electric vehicle, a motorcycle, bicycle, personal mobility, airplane, drone, ship, and robot.

Figure 21:
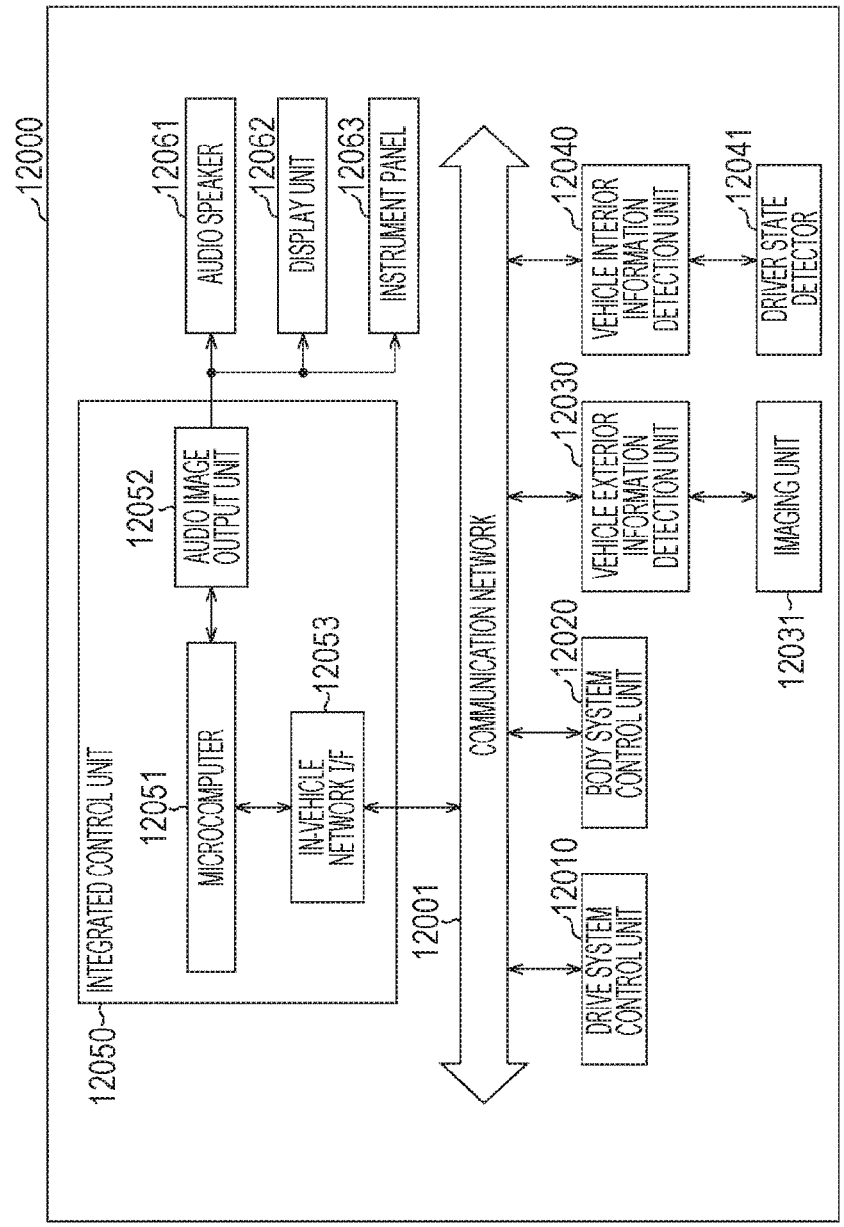
FIG. 21 is a block diagram illustrating a schematic configuration example of a vehicle control system.

FIG. 21 is a block diagram illustrating an example of a schematic configuration of a vehicle control system as an example of a mobile body control system to which the technology according to the present disclosure can be applied.

A vehicle control system 12000 includes a plurality of electronic control units connected via a communication network 12001. In the example illustrated in FIG. 21, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls operation of the apparatus related to the drive system of the vehicle in accordance with various programs. For example, the drive system control unit 12010 functions as a control apparatus of a driving force generation apparatus that generates a driving force of a vehicle such as an internal combustion engine or a driving motor, a driving force transmission mechanism that transmits a driving force to the wheels, a steering mechanism that adjusts steering angle of the vehicle, a braking apparatus that generates a braking force of the vehicle, or the like.

The body system control unit 12020 controls operation of various devices equipped on the vehicle body in accordance with various programs. For example, the body system control unit 12020 functions as a control apparatus for a keyless entry system, a smart key system, a power window device, or various lamps such as a head lamp, a back lamp, a brake lamp, a turn signal lamp, or a fog lamp. In this case, the body system control unit 12020 can receive inputs of a radio wave transmitted from a portable device that substitutes a key, or a signal of various switches. The body system control unit 12020 receives inputs of these radio waves or signals and controls the door lock device, the power window device, the lamp, etc. of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing on objects such as a person, a car, an obstacle, a sign, and a character on a road surface on the basis of the received image.

The imaging unit 12031 is an optical sensor that receives light and outputs an electric signal corresponding to the amount of light received. The imaging unit 12031 can output an electric signal as an image or output it as distance measurement information. In addition, the light received by the imaging unit 12031 may be visible light or invisible light such as infrared light.

The vehicle interior information detection unit 12040 detects information inside the vehicle. The vehicle interior information detection unit 12040 is connected with a driver state detector 12041 that detects the state of the driver, for example. The driver state detector 12041 may include a camera that images the driver, for example. The vehicle interior information detection unit 12040 may calculate the degree of fatigue or degree of concentration of the driver or may determine whether or not the driver is dozing off on the basis of the detection information input from the driver state detector 12041.

The microcomputer 12051 can calculate a control target value of the driving force generation apparatus, the steering mechanism, or the braking apparatus on the basis of vehicle external/internal information obtained by the vehicle exterior information detection unit 12030 or the vehicle interior information detection unit 12040, and can output a control command to the drive system control unit 12010. For example, the microcomputer 12051 can perform cooperative control for the purpose of achieving a function of an advanced driver assistance system (ADAS) including collision avoidance or impact mitigation of vehicles, follow-up running based on an inter-vehicle distance, cruise control, vehicle collision warning, vehicle lane departure warning, and the like.

Furthermore, it is allowable such that the microcomputer 12051 controls the driving force generation apparatus, the steering mechanism, the braking apparatus, or the like, on the basis of the information regarding the surroundings of the vehicle obtained by the vehicle exterior information detection unit 12030 or the vehicle interior information detection unit 12040, thereby performing cooperative control for the purpose of automatic driving or the like of performing autonomous traveling without depending on the operation of the driver.

In addition, the microcomputer 12051 can output a control command to the body system control unit 12020 on the basis of the vehicle exterior information obtained by the vehicle exterior information detection unit 12030. For example, the microcomputer 12051 can control the head lamp in accordance with the position of the preceding vehicle or the oncoming vehicle sensed by the vehicle exterior information detection unit 12030, and thereby can perform cooperative control aiming at antiglare such as switching the high beam to low beam.

The audio image output unit 12052 transmits an output signal in the form of at least one of audio or image to an output apparatus capable of visually or audibly notifying the occupant of the vehicle or the outside of the vehicle of information. In the example of FIG. 21, an audio speaker 12061, a display unit 12062, and an instrument panel 12063 are illustrated as exemplary output apparatuses. The display unit 12062 may include at least one of an on-board display or a head-up display, for example.

Figure 22:
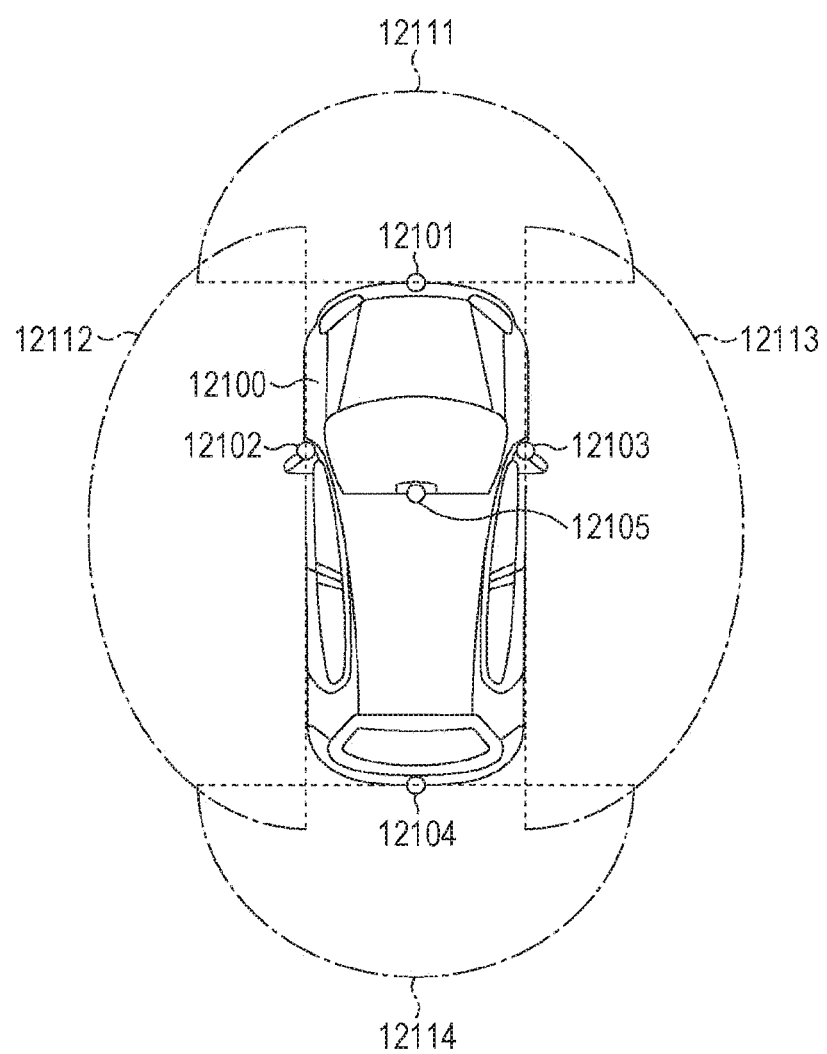
FIG. 22 is an explanatory diagram illustrating an example of installation positions of a vehicle exterior information detection section and an imaging unit.

FIG. 22 is a diagram illustrating an example of an installation position of the imaging unit 12031.

In FIG. 22, the imaging unit 12031 includes imaging units 12101, 12102, 12103, 12104, and 12105.

For example, the imaging units 12101, 12102, 12103, 12104, and 12105 are provided in the positions on a vehicle 12100, including a nose, a side mirror, a rear bumper, a back door, an upper portion of windshield in a passenger compartment, and the like. The imaging unit 12101 provided at a nose and the imaging unit 12105 provided on the upper portion of the windshield in the passenger compartment mainly obtain an image ahead of the vehicle 12100. The imaging units 12102 and 12103 provided at the side mirror mainly obtain images of the side of the vehicle 12100. The imaging unit 12104 provided in the rear bumper or the back door mainly obtains an image behind the vehicle 12100. The imaging unit 12105 provided at an upper portion of the windshield in the passenger compartment is mainly used for detecting a preceding vehicle, a pedestrian, an obstacle, a traffic signal, a traffic sign, a lane, or the like.

FIG. 22 illustrates an example of photographing ranges of the imaging units 12101 to 12104. An imaging range 12111 represents an imaging range of the imaging unit 12101 provided at the nose, imaging ranges 12112 and 12113 each represent imaging ranges of the imaging units 12102 and 12103 provided at the side mirror, and an imaging range 12114 represents an imaging range of the imaging unit 12104 provided at the rear bumper or the back door. For example, the image data captured by the imaging units 12101 to 12104 are overlapped, thereby producing an overhead view image of the vehicle 12100 viewed from above.

At least one of the imaging units 12101 to 12104 may have a function of obtaining distance information. For example, at least one of the imaging units 12101 to 12104 may be a stereo camera including a plurality of imaging elements, or may be an imaging element having pixels for phase difference detection.

For example, the microcomputer 12051 can calculate a distance to each of three-dimensional objects in the imaging ranges 12111 to 12114 and a temporal change (relative speed with respect to the vehicle 12100) of the distance on the basis of the distance information obtained from the imaging units 12101 to 12104, and thereby can extract a three-dimensional object traveling at a predetermined speed (for example, 0 km/h or more) in substantially the same direction as the vehicle 12100 being the nearest three-dimensional object on the traveling path of the vehicle 12100, as a preceding vehicle. Furthermore, the microcomputer 12051 can set an inter-vehicle distance to be ensured in front of the preceding vehicle in advance, and can perform automatic brake control (including follow-up stop control), automatic acceleration control (including follow-up start control), or the like. In this manner, it is possible to perform cooperative control aiming at automatic driving or the like of achieving autonomous traveling without depending on the operation of the driver.

For example, on the basis of the distance information obtained from the imaging units 12101 to 12104, the microcomputer 12051 can extract three-dimensional object data regarding the three-dimensional object with classification into three-dimensional objects such as a two-wheeled vehicle, a regular vehicle, a large vehicle, a pedestrian, and other three-dimensional objects such as a utility pole, and can use the extracted data for automatic avoidance of obstacles. For example, the microcomputer 12051 discriminates an obstacle in the vicinity of the vehicle 12100 as an obstacle having high visibility from the driver of the vehicle 12100 from an obstacle having low visibility from the driver. Next, the microcomputer 12051 determines a collision risk indicating the risk of collision with each of obstacles. When the collision risk is a set value or more and there is a possibility of collision, the microcomputer 12051 can output an alarm to the driver via the audio speaker 12061 and the display unit 12062, and can perform forced deceleration and avoidance steering via the drive system control unit 12010, thereby achieving driving assistance for collision avoidance.

At least one of the imaging units 12101 to 12104 may be an infrared camera for detecting infrared rays. For example, the microcomputer 12051 can recognize a pedestrian by determining whether or not a pedestrian exists in the captured images of the imaging units 12101 to 12104. Such pedestrian recognition is performed, for example, by a procedure of extracting feature points in a captured image of the imaging units 12101 to 12104 as an infrared camera, and by a procedure of performing pattern matching processing on a series of feature points indicating the contour of the object to discriminate whether or not it is a pedestrian. When the microcomputer 12051 determines that a pedestrian is present in the captured images of the imaging units 12101 to 12104 and recognizes a pedestrian, the audio image output unit 12052 controls the display unit 12062 to perform superimposing display of a rectangular contour line for emphasis to the recognized pedestrian. Furthermore, the audio image output unit 12052 may control the display unit 12062 to display icons or the like indicating pedestrians at desired positions.

Hereinabove, an example of the vehicle control system to which the technology according to the present disclosure can be applied has been described. The technology according to the present disclosure can be suitably applied to the imaging unit 12101 out of the above-described configuration, for example. Applying the technique according to the present disclosure to the imaging unit 12101 can suppress the streaks of image data while suppressing an increase in the size of the imaging unit 12101.

Note that the above-described embodiment illustrates an example for embodying the present technology, and the each matter of the embodiments corresponds to the each subject matter of the invention included in the appended claims. Similarly, the each subject matter of the invention included in the appended claims corresponds to the each matter under the same names as the matter in the embodiments of the present technology. The present technology, however, is not limited to the embodiments, and various modifications can be made to the embodiments without departing from the scope of the technology.

Furthermore, the processing procedure in the above-described embodiments may be regarded as a method including these series of procedures, and as a program that causes a computer to execute these series of procedures or as a recording medium that stores the program. This recording medium can be a compact disc (CD), a mini disc (MD), a digital versatile disc (DVD), a memory card, a Blu-ray (registered trademark) disc, or the like, for example.

Note that effects described here in the present description are provided for purposes of exemplary illustration and are not intended to be limiting. Still other effects may also be contemplated.

Note that the present technology may also be configured as below.

(1) A solid-state imaging element including:

a pixel array unit including a plurality of lines each including a predetermined number of pixels arrayed in a predetermined direction;

an analog-to-digital conversion unit that arranges more than the predetermined number of analog-to-digital converters that convert an analog signal into a digital signal;

a scanning circuit that controls to sequentially select the plurality of lines and output more than the predetermined number of the analog signals to the analog-to-digital conversion unit every time the line is selected; and a correction unit that performs black level correction processing on the digital signal.

(2) The solid-state imaging element according to (1), in which the analog signal includes an effective pixel signal and a reference signal indicating a black level, and the analog-to-digital conversion unit includes an effective pixel signal conversion unit that converts the effective pixel signal into the digital signal and outputs the digital signal as effective pixel data, and a reference signal conversion unit that converts the reference signal into the digital signal and outputs the digital signal as reference data, and the correction unit performs processing of obtaining a difference between the effective pixel data and the reference data, as the black level correction processing.

(3) The solid-state imaging element according to (2), further including a dummy circuit that generates the reference signal, in which, every time the line is selected, the scanning circuit drives each of the pixels in the selected line to cause the pixel to output the effective pixel signal and causes the dummy circuit to output the reference signal.

(4) The solid-state imaging element according to (2) or (3), in which the analog-to-digital conversion unit includes a plurality of the reference signal conversion units and a plurality of the effective pixel signal conversion units, and each of the reference signal conversion units is arranged dispersedly between each of the effective pixel signal conversion units.

(5) The solid-state imaging element according to any of (2) to (4), in which the pixel array unit includes effective pixels for generating the effective pixel signal and light-shielding pixels for generating the reference signal, being arrayed as the pixels.

(6) The solid-state imaging element according to (5), in which the plurality of lines includes a plurality of effective pixel lines in which the predetermined number of the effective pixels are arrayed in the predetermined direction, and a light-shielding pixel line in which the predetermined number of the light-shielding pixels are arrayed in the predetermined direction, and the scanning circuit simultaneously selects one of the plurality of effective pixel lines, and the light-shielding pixel line, and controls the selected one effective pixel line and the light-shielding pixel line to output the effective pixel signal and the reference signal, respectively.

(7) The solid-state imaging element according to (5), in which each of the plurality of lines includes the effective pixel and the light-shielding pixel, and the scanning circuit controls to output the effective pixel signals, the number of the effective pixel signals being equal to the number of effective pixels in the selected line, and controls to output the reference signals, the number of the reference signals being more than the number of light-shielding pixels in the selected line.

(8) The solid-state imaging element according to any of (1) to (7), in which the analog-to-digital conversion unit and the correction unit are arranged on the predetermined substrate, and the pixel array unit and the scanning circuit are arranged on a substrate stacked on the predetermined substrate.

(9) The solid-state imaging element according to any of (1) to (8), in which the analog-to-digital conversion unit includes first and second analog-to-digital conversion units, and the scanning circuit simultaneously selects first and second lines out of the plurality of lines and controls to output the analog signal corresponding to the first line to the first analog-to-digital conversion unit and controls to output the analog signal corresponding to the second line to the second analog-to-digital conversion unit.

(10) The solid-state imaging element according to any of (1) to (9), in which the black level correction processing includes processing of multiplying the digital signal by a correction coefficient set for each of lines.

(11) An electronic device including:

a pixel array unit including an array of a plurality of lines each including a predetermined number of pixels arrayed in a predetermined direction;

an analog-to-digital conversion unit that arranges more than the predetermined number of analog-to-digital converters that convert an analog signal into a digital signal;

a scanning circuit that controls to sequentially select the plurality of lines and output more than the predetermined number of the analog signals to the analog-to-digital conversion unit every time the line is selected;

a correction unit that corrects the digital signal; and a signal processing unit that performs black level correction processing on the digital signal that has undergone the black level correction processing.

(12) A method for controlling a solid-state imaging element, the method including:

a scanning procedure of, in a pixel array unit including a plurality of lines each including a predetermined number of pixels arrayed in a predetermined direction, controlling to sequentially select the plurality of lines and output, every time the line is selected, more than the predetermined number of the analog signals to the analog-to-digital conversion unit that arranges more than the predetermined number of analog-to-digital converters; and a correction procedure of performing black level correction processing on the digital signal.

REFERENCE SIGNS LIST

100 Electronic device
110 Imaging lens
120 Image processing unit
130 Imaging control unit
140 Recording unit
200 Solid-state imaging element
201 Semiconductor substrate
202 Upper substrate
203 Lower substrate
210 Scanning circuit
220 Column ADC
221 OPB column conversion unit
222 ADC
223 Effective pixel column conversion unit
224 Reference signal conversion unit
230 Upper column ADC
240 Lower column ADC
250 Logic circuit
251, 271 Correction value calculation unit
252, 272 Black level correction unit
253, 273 Subtractor
254, 274 Per-line correction coefficient holding unit
255, 275 Vertical shading correction unit
256, 276 Multiplier
270 Lower logic circuit
277 Adder
280 Timing control unit
290 Dummy circuit
300 Pixel array unit
310 Effective pixel region
320 Effective pixel
321, 361 Reset transistor
322, 362 Transfer transistor
323, 363 Photodiode
324, 364, 291 Amplification transistor
325, 365 Floating diffusion layer
326, 366, 292 Selection transistor
350, 390 OPB region
360, 391 OPB pixel
370 Upper OPB region
380 Lower OPB region
12101 Imaging unit

The invention claimed is:

1. A solid-state imaging element, comprising:
a pixel array including a plurality of lines,
wherein each of the plurality of lines includes a specific number of pixels in a specific direction;
a scanning circuit configured to:
control selection of a first line of the plurality of lines; and
control output of a first number of analog signals based on the selection of the first line;
a first column analog-to-digital converter that includes a plurality of reference signal converters and a plurality of effective pixel signal converters, wherein
the plurality of reference signal converters and the plurality of effective pixel signal converters include a specific number of analog-to-digital converters,
the specific number of analog-to-digital converters are configured to convert the first number of analog signals into a specific number of digital signals, and
each of the plurality of effective pixel signal converters is between corresponding reference signal converters of the plurality of reference signal converters; and
a logic circuit configured to execute a black level correction process on the specific number of digital signals.

2. The solid-state imaging element according to claim 1, wherein
the first number of analog signals includes effective pixel signals and reference signals,
each of the reference signals indicates a black level,
the plurality of effective pixel signal converters is configured to:
convert the effective pixel signals into a first set of digital signals of the specific number of digital signals; and
output the first set of digital signals as effective pixel data,
the plurality of reference signal converters is configured to:
convert the reference signals into a second set of digital signals of the specific number of digital signals; and
output the second set of digital signals as reference data
the logic circuit is further configured to obtain a difference between the effective pixel data and the reference data, and
the obtainment of the difference corresponds to the black level correction process.

3. The solid-state imaging element according to claim 2, further comprising a dummy circuit configured to generate the reference signals,
wherein, based on the selection of the first line, the scanning circuit is further configured to:
drive each of the specific number of pixels in the first line;
control the specific number of pixels to output the effective pixel signals; and
control the dummy circuit to output the reference signals.

4. The solid-state imaging element according to claim 2, wherein
the pixel array includes effective pixels and light-shielding pixels,
the effective pixels are configured to generate the effective pixel signals, and
the light-shielding pixels are configured to generate the reference signals.

5. The solid-state imaging element according to claim 4, wherein
the plurality of lines further includes:
a plurality of effective pixel lines that includes the effective pixels in the specific direction, and
a light-shielding pixel line that includes the light-shielding pixels in the specific direction, and the scanning circuit is further configured to:
simultaneously select an effective pixel line of the plurality of effective pixel lines and the light-shielding pixel line; and
control the selected effective pixel line and the light-shielding pixel line to output the effective pixel signals and the reference signals, respectively.

6. The solid-state imaging element according to claim 4, wherein
each of the plurality of lines further includes the effective pixels and the light-shielding pixels,
the scanning circuit is further configured to:
control the effective pixels to output the effective pixel signals; and
control the light-shielding pixels to output the reference signals,
a number of the effective pixel signals is equal to a number of the effective pixels in the first line, and
a number of the reference signals is more than a number of the light-shielding pixels in the first line.

7. The solid-state imaging element according to claim 1, wherein
the first column analog-to-digital converter and the logic circuit are on a first substrate,
the pixel array and the scanning circuit are on a second substrate, and
the second substrate is on the first substrate.

8. The solid-state imaging element according to claim 1, wherein
the first column analog-to-digital converter further includes a second column analog-to-digital converter and a third column analog-to-digital converter, and
the scanning circuit is further configured to:
simultaneously select the first line and a second line of the plurality of lines;
control the output of the first number of analog signals, corresponding to the first line, to the second column analog-to-digital converter; and
control output of a second number of analog signals, corresponding to the second line, to the third column analog-to-digital converter.

9. The solid-state imaging element according to claim 1, wherein the black level correction process includes multiplication of each of the specific number of digital signals by a correction coefficient set for each of the plurality of lines.

10. An electronic device, comprising:
a pixel array including a plurality of lines,
wherein each of the plurality of lines includes a specific number of pixels in a specific direction;
a scanning circuit configured to:
control selection of a line of the plurality of lines; and
control output of a specific number of analog signals based on the selection of the line;
a column analog-to-digital converter that includes a plurality of reference signal converters and a plurality of effective pixel signal converters, wherein
the plurality of reference signal converters and the plurality of effective pixel signal converters include a specific number of analog-to-digital converters,
the specific number of analog-to-digital converters are configured to convert the specific number of analog signals into a specific number of digital signals, and
each of the plurality of effective pixel signal converters is between corresponding reference signal converters of the plurality of reference signal converters;
a logic circuit configured to execute a black level correction process on the specific number of digital signals; and
a signal processing circuit configured to process the specific number of digital signals based on the black level correction process.

11. A control method comprising:
controlling, by a scanning circuit of a solid-state imaging element, selection of a line of a plurality of lines of a pixel array of the solid-state imaging element,
wherein each of the plurality of lines includes a specific number of pixels in a specific direction;
controlling, by the scanning circuit based on the selection of the line, output of a specific number of analog signals to a column analog-to-digital converter of the solid-state imaging element, wherein
the column analog-to-digital converter includes a plurality of reference signal converters and a plurality of effective pixel signal converters,
the plurality of reference signal converters and the plurality of effective pixel signal converters include a specific number of analog-to-digital converters, and
each of the plurality of effective pixel signal converters is between corresponding reference signal converters of the plurality of reference signal converters;
converting, by the specific number of analog-to-digital converters, the specific number of analog signals into a specific number of digital signals; and
executing, by a logic circuit of the solid-state imaging element, a black level correction process on the specific number of digital signals.

* * * * *